(12) United States Patent
Ramamurthy et al.

(10) Patent No.: US 12,333,442 B2
(45) Date of Patent: Jun. 17, 2025

(54) INTELLIGENT UPDATING AND DATA PROCESSING FOR DEPLOYED MACHINE LEARNING MODELS

(71) Applicant: CERNER INNOVATION, INC., Kansas City, KS (US)

(72) Inventors: Uttam B. Ramamurthy, Bangalor (IN); David Dellsperger, Kansas City, MO (US); Christopher S. Finn, Liberty, MO (US); Brandon Davis, Kansas City, MO (US); James Gritter, Parkville, MO (US); Stephen Patel, Kansas City, MO (US); Maulik Gandhi, De Pere, WA (US); Adam Sabaliauskas, Lee's Summit, MO (US)

(73) Assignee: Cerner Innovation, Inc., Kansas City, MO (US)

( * ) Notice: Subject to any disclaimer, the term of this patent is extended or adjusted under 35 U.S.C. 154(b) by 1001 days.

(21) Appl. No.: 17/354,693

(22) Filed: Jun. 22, 2021

(65) Prior Publication Data

US 2022/0405619 A1    Dec. 22, 2022

(51) Int. Cl.
*G06N 3/09*         (2023.01)
*G06F 16/2455*      (2019.01)
*G06N 3/096*        (2023.01)
*G06N 5/04*         (2023.01)
*G06N 20/00*        (2019.01)

(52) U.S. Cl.
CPC ....... *G06N 3/096* (2023.01); *G06F 16/24568* (2019.01); *G06N 5/04* (2013.01); *G06N 20/00* (2019.01)

(58) Field of Classification Search
CPC ............ G06N 3/096; G06N 3/08; G06N 3/09
See application file for complete search history.

(56) References Cited

U.S. PATENT DOCUMENTS

| | | | |
|---|---|---|---|
| 10,937,108 B1 * | 3/2021 | Tabak | G06N 3/045 |
| 11,429,893 B1 * | 8/2022 | Tong | G06N 20/00 |
| 2019/0108443 A1 * | 4/2019 | Dwarakanath | G06F 11/3684 |
| 2019/0356539 A1 * | 11/2019 | Soon-Shiong | H04L 41/069 |
| 2020/0327371 A1 * | 10/2020 | Sharma | H04L 67/562 |
| 2021/0116895 A1 * | 4/2021 | Paul | G06F 11/3447 |
| 2021/0125104 A1 * | 4/2021 | Christiansen | G06N 20/10 |

(Continued)

OTHER PUBLICATIONS

NPL Brzezinski Reacting to Different Types of Concept Drift 2014.*

(Continued)

*Primary Examiner* — Paul M Knight
(74) *Attorney, Agent, or Firm* — Invoke

(57) ABSTRACT

Particular embodiments can update a deployed machine learning model with actual entity data depending on anomalies detected in stream data, which can be stored to a computer object, such as a journal. Various embodiments map particular subsets of a larger pool of raw input data to the particular models that need the input data and store the raw input data to computer objects so that the corresponding machine learning models can make predictions according to any suitable policy or triggering event on any of the data located in the computer objects. Such mapping allows each machine learning model to continuously make predictions based on the data it needs.

23 Claims, 11 Drawing Sheets

(56) References Cited

U.S. PATENT DOCUMENTS

2022/0092407 A1* 3/2022 Chen .................. G06N 3/08
2022/0334200 A1* 10/2022 Messier ............. G06N 3/048
2022/0357729 A1* 11/2022 Xu .................... G06N 3/094

OTHER PUBLICATIONS

NPL Gama Learning with Drift Detection 2004.*
NPL He Distributed log analytics using Apache Kafka 2018.*
NPL Lu Learning under Concept Drift_A Review 2019.*
NPL Tennant Scalable realtime classification of data streams with concept drift 2017.*
NPL Weyns Towards Better Adaptive Systems by Combining MAPE Control Theory and ML May 2021.*
NPL Xie A Selective Transfer Learning Method 2017.*
NPL Zenisek Machine learning based concept drift detection for predictive maintenance 2019.*
NPL Benczur Online Machine Learning in Big Data Streams 2018.*
NPL Carpenter ARTMAP 1991.*
NPL Pesaranghader McDiarmid Drift Detection Evolving Data Streams 2018.*
NPL Sarnovsky Classification of the drifting data streams Apr. 2021.*
NPL Zliobaite Learning under Concept Drift an Overview 2010.*

* cited by examiner

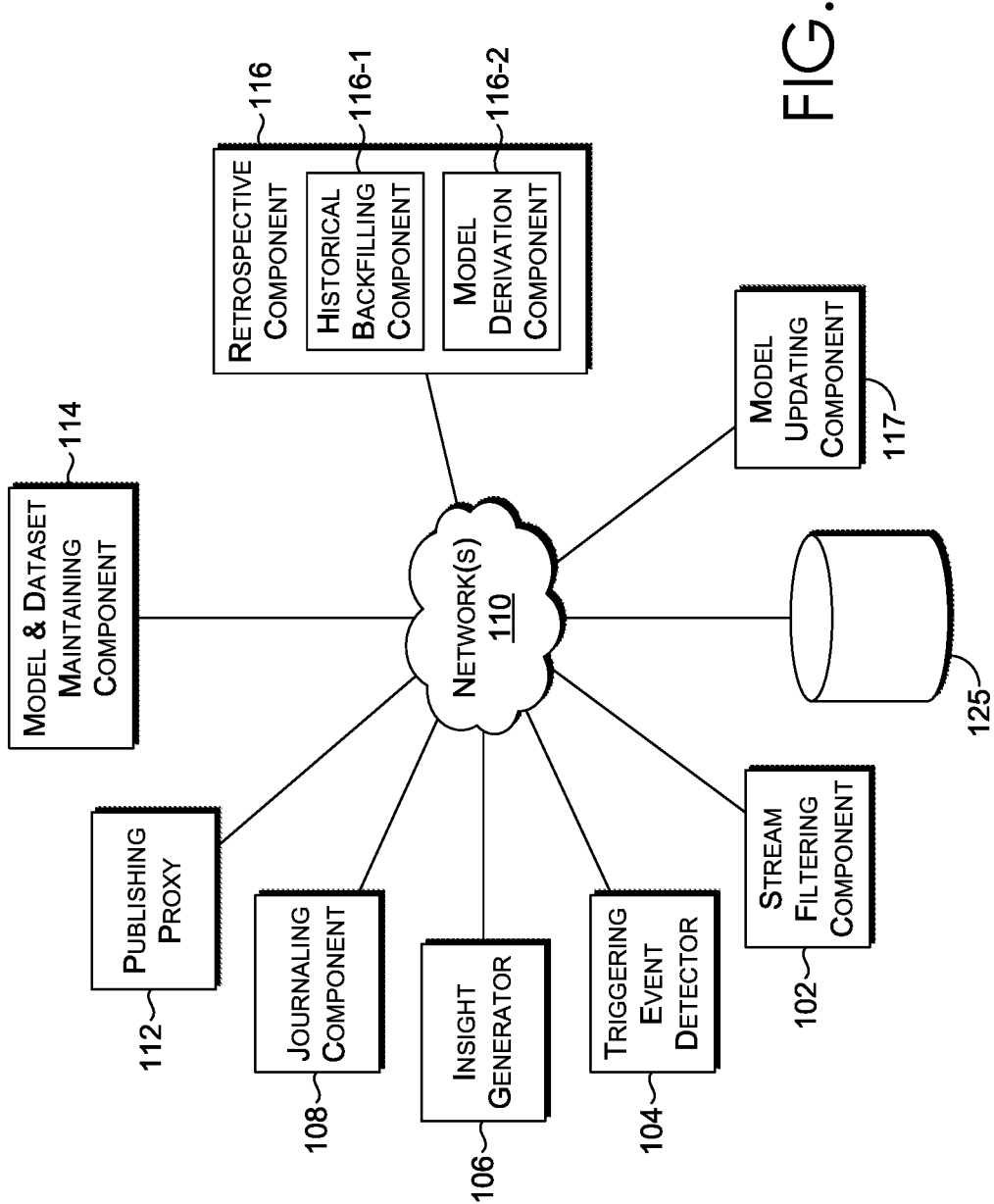

600

| Model ID | Entry ID | Timestamp | Payload Input Data | Metadata Y |
|---|---|---|---|---|
| 1 | 1 | 2021-1-13; 13:05 | HR, 70 BPM | |
| 1 | 2 | 2021-1-13; 13:07 | HR, 74 BPM | |
| 1 | 3 | 2021-1-13; 13:08 | Patient Symptoms A, B, C | |
| 1 | 4 | 2021-1-13; 13:08 | HR, 96 BPM | |
| ... | ... | ... | ... | ... |

| Model ID | Entry ID | Timestamp | ML Predictions | Model Snapshot | Metadata P |
|---|---|---|---|---|---|
| 1 | 1 | 2021-1-13; 13:09 | Patient likely to experience tachycardia | 0006 | |
| 1 | 2 | 2021-1-13; 14:10 | Patient needs to be rushed to hospital | 0006 | |
| 1 | 3 | 2021-1-13; 15:06 | Patient will likely show x, y, z signs | 0006 | |
| 1 | 4 | 2021-1-14; 8:04 | Patient will likely be able to leave hospital | 0007 | |
| ... | ... | ... | ... | ... | ... |

FIG. 7

INTELLIGENT UPDATING AND DATA PROCESSING FOR DEPLOYED MACHINE LEARNING MODELS

BACKGROUND

Before a machine learning model is deployed in an actual production environment, various steps typically occur. For example, the machine learning model must be prepared (e.g., via pre-processing the data), installed, configured, trained on specific data sets, and tested at an entity (e.g., client) site. Model or data preparation can include many individual steps, such as cleaning, normalization, feature engineering and selection, model selection, hyperparameter or weight optimization, parameter optimization, evaluation metric selection, and the like. After preparation, each model is then typically individually trained on entity data to make suitable predictions depending on the specific entity needs. Such entity data is either of a very different type between entities (e.g., clinical data versus market forecast data) or is associated with very different values depending on, for example, geographic location of the entities (e.g., a rural hospital versus an urban hospital). In other words, typical machine learning models are tailored to each entity and are thus not scalable or useable outside of the context needed by the particular entity. Tailoring models to each entity, however, is burdensome given these steps required before deployment.

Once the various steps described above occur for each entity and certain benchmarks are met (e.g., the loss from a loss function is acceptable), the machine learning model is deemed to be "done" and is subsequently deployed. The hope is that the deployed machine learning model will be able generalize or make accurate predictions from new input data never processed by the machine learning model when it was learning and testing. However, there are often unforeseeable circumstances that occur after model deployment, which causes the data or new predictions to differ significantly from the training data, test data, or testing predictions. This causes problems, such as data drift or model drift, among other things. Accordingly, existing machine learning models can be inaccurate.

BRIEF SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present disclosure relate to computer-implemented methods, computer storage media, and systems that improve existing models by improving the scalability and accuracy, among other things. In operation, particular embodiments can update (e.g., retrain or tune) a deployed machine learning model with actual client data depending on anomalies (e.g., bias, data drift, data latency) detected in stream data. This stream data (along with machine learning model predictions) can be stored to a computer object that stores time-based streaming events (e.g., a journal). Such computer objects are used to perform improved functionality relative to existing technologies, such as "re-playing" or re-accessing different machine learning models at different times, re-training a machine learning model, as well as publishing different insights or notifications. This improves upon the accuracy of existing models that are statically deployed because they are not able to be intelligently updated or used.

Various embodiments further improve upon the scalability of existing models by mapping particular subsets of a larger pool of raw input data (e.g., stream data) to the particular models that need the input data and storing the raw input data to computer objects so that the corresponding machine learning models can make predictions according to any suitable policy or triggering event on any of the data located in the computer objects. Such mapping allows each machine learning model to continuously make predictions based on the data it needs.

BRIEF DESCRIPTION OF THE SEVERAL VIEWS OF THE DRAWINGS

FIG. 1 is a block diagram of an example computing system for use in implementing some embodiments;

FIG. 6 illustrates an example journal data structure, according to some embodiments;

FIG. 7 illustrates an example journal data structure, according to some embodiments;

DETAILED DESCRIPTION

Figure 2A:
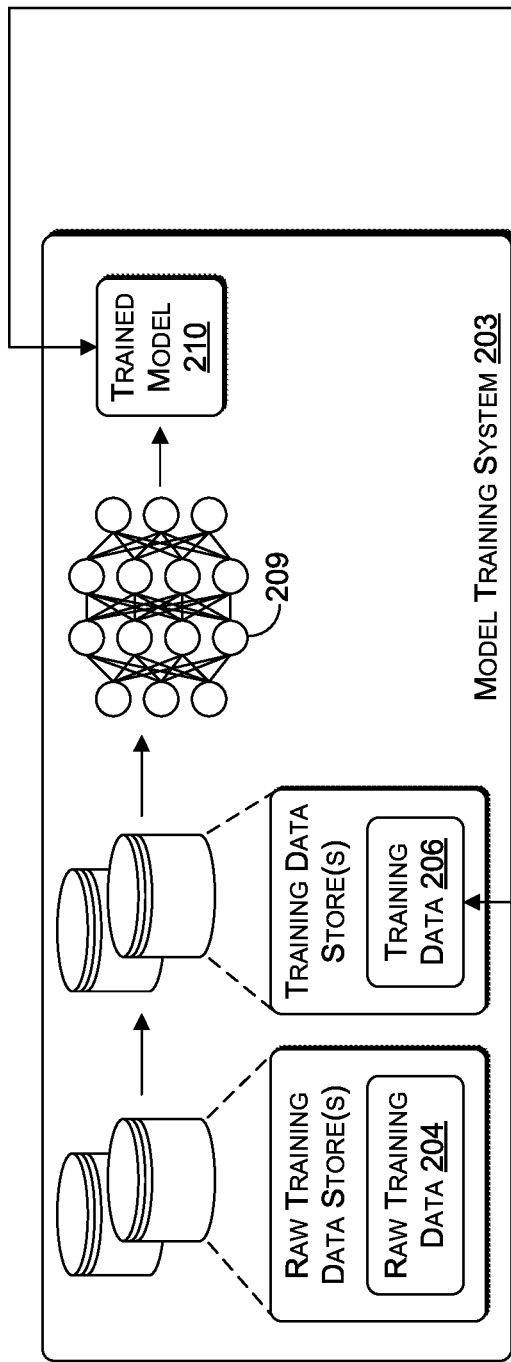
FIG. 2A is a schematic diagram illustrating an example model training system, according to some embodiments.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

As described above, existing machine learning models are not scalable. Because typical machine learning models are tailored to each entity, they are not scalable or useable outside of the context needed by the particular entity. In an illustrative example, two clients—a first hospital in a high-population urbanized city and a second hospital in a low-population rural town—may need to predict emergency department patient volume in order to prepare for staffing and personal protective equipment (PPE) needs. However, a first machine learning model used to make predictions for the first hospital would not be generalizable to the second hospital. This is because the first hospital emergency department volumes are likely to be much higher and different relative to the second hospital because the first hospital is located in an urbanized city, as opposed to a rural town. In other words, making predictions for the second hospital using the same model would break the model or cause severe inaccuracies because the model would be trained using the first hospital volume fluctuations. Accordingly, each client would need its own tailored model built, which is arduous to build for each client given the necessary configuration and other steps needed for deployment.

In order to remedy these technical problems with scalability, some machine learning model technologies employ a generalized model that attempts to fit a generic model to different entities. For example, using the illustration above for a regression model problem, the model may try form a regression line by averaging out different emergency room visits between the two different hospitals to make a prediction (e.g., averaging 10 and 80 to predict that there will be 45 hospital visits for both sites). However, these predictions would be inaccurate for both entities, as the model would not sufficiently fit the data for either entities.

As described above, existing machine learning models are also inaccurate. There are often unforeseeable circumstances that occur after model deployment, which causes the data or new predictions to differ significantly from the training data, test data, or old predictions. This causes problems, such as data drift or model drift, among other things. Drift refers to a model losing its predictive ability. Changes in the relationships between input and output data occur over time. "Data drift" is a change in an independent variable or input data used in a predictive task over time. With data drift, distribution in data changes or evolves over time, thereby potentially introducing unseen patterns and variations in the data. "Model drift" (or "concept drift") is a change in a target variable or machine learning model prediction (e.g., classification) over time. With model drift, the interpretation of data changes over time even though the distribution in the data typically does not. In an illustrative example of data drift, a machine learning model may predict the number of emergency room visits for a particular hospital for a particular week. However, due to a long-lasting pandemic and corresponding legislative actions (e.g., a cap on the number of people who may visit per hour), the distribution or volume during the pandemic visits may have been substantially reduced relative to the distribution of volume visits used in the training data to make prediction. This may cause the model to over-predict patient volume during the duration of the pandemic due data drift issues. In an illustrative example of model drift, training labels may indicate that an input image belongs to class A (e.g., a first genus and species organism). However, due to understanding of properties of A and B changing over time, the same input should belong to class B (e.g., a second genus and species organism). Accordingly, deployed machine learning models often become inaccurate due to drift or other issues (e.g., machine learning model bias).

Various embodiments of the present disclosure provide one or more technical solutions to these technical problems and others, as described herein. In operation, various embodiments derive a trained machine learning model. Subsequently, these embodiments receive a set of stream data (e.g., a continuous sequence of sensor data) and store the set of stream data to a first computer object (e.g., a journal) that records streaming events. At least partially in response to receiving a triggering event (e.g., an HTTP request), an estimate is generated via the trained machine learning model using the set of stream data as input. In some embodiments, the estimate itself is stored to a second computer object (e.g., another journal) that records estimates of the trained machine learning model. The first computer object and/or the second computer object can be scanned in order to detect an anomaly (e.g., data drift or model drift) with the set of stream data and/or the estimate. Based at least in part on the detection of the anomaly, some embodiments feed the set of stream data and/or the estimate to the trained machine learning model to update the trained machine learning model. These computer objects can be used to perform varied functionality, such as re-playing or re-accessing different machine learning models at different times, re-training a machine learning model, as well as publishing different notifications, as described in more detail herein.

Some embodiments of the present disclosure are directed to receiving a large pool of stream data from various data sources and subsequently extracting, from the large pool of stream data, a subset of data and map (e.g., via a graph data structure) the subset to a particular machine learning model that needs the subset of data to make predictions. At least partially in response to detecting a triggering event (e.g., a request to access the last 10 minutes of streaming data) and based at least in part on the mapping, some embodiments access the subset of data (e.g., from a journal) and feed the subset of data as input into the particular machine learning model so that the particular machine learning model can make an estimate or prediction (e.g., a classification).

Various embodiments improve existing machine learning models because they are scalable and are more accurate. For instance, some embodiments continuously update (e.g., retrain or tune) deployed machine learning models with actual entity data depending on anomalies detected. Using the illustration above, if two clients—a first hospital in a high-population urbanized city and a second hospital in a low-population rural town—need to predict emergency department volume in order to prepare for the volume via staffing and personal protective equipment (PPE), the same (or tailored) model (e.g., a containerized autoML model) could be deployed to both entities. After detecting unique anomalies (e.g., data drift or model drift) in a journal with both models, particular embodiments can update the corresponding models with each hospital's unique actual patient volume data set for retraining. Accordingly, predictions will become accurate regardless of whether the first hospital emergency department volumes are likely to be much higher and different relative to the second hospital because each deployed model will be retrained or tuned on the hospital's actual volume data sets. In other words, making predictions for the same hospitals using the same initial model would not break the model, unlike existing technologies, and cause severe inaccuracies because each model can be uniquely tailored to each hospital's actual volume count numbers over time. Accordingly, each client would not need its own tailored model initially built to sustain itself throughout the life of the machine learning model. Therefore, it would not be arduous to build given the flexibility of incorporating machine learning model updates into deployed machine learning models.

Some embodiments improve the scalability and accuracy of existing machine learning models by mapping particular subsets of a larger pool of raw input data to the particular models that need the input data and storing the raw input data to computer objects (e.g., a journal data structure) so that the corresponding machine learning models can make predictions (which may also be stored to computer objects) according to any suitable policy or triggering event on any of the data located in the computer objects. Such mapping allows each machine learning model to continuously make predictions based on the data it needs. Such computer objects are used to improve the user experience or perform improved functionality relative to existing technologies, such as "re-playing" or re-accessing different machine learning models at different times, re-training a machine learning model, as well as publishing different insights or notifications, as described in more detail herein.

Turning now to FIG. 1, an example computing system 100 is depicted suitable for use in implementing embodiments of the present invention. The computing system 100 is merely an example of one suitable computing system environment and is not intended to suggest any limitation as to the scope of use or functionality of embodiments of the present invention. Neither should the computing system 100 be interpreted as having any dependency or requirement related to any single module/component or combination of modules/components illustrated therein. In some embodiments, some or each of the computing system 100's components are located within the server(s) 1102 of FIG. 11. Alternatively or additionally, in some embodiments, some or each of the computing system 100's components are located within the one or more remote computers 1108.

In some embodiments, one or more of the illustrated components/modules of the system 100 may be implemented as stand-alone applications. In other embodiments, one or more of the illustrated components/modules may be distributed across multiple consult engines or computing device hosts. For example, the components may represent or included in a corresponding cloud computing node of a cloud computing environment. The components/modules illustrated in FIG. 1 are exemplary in nature and in number and should not be construed as limiting. Any number of components/modules may be employed to achieve the desired functionality within the scope of embodiments hereof.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components/modules, and in any suitable combination and location. Various functions described herein as being performed by one or more entities may be carried out by hardware, firmware, and/or software. For instance, various functions may be carried out by a processor executing instructions stored in memory.

The computing system 100 is generally configured to detect one or more anomalies (e.g., data drift) of an existing deployed machine learning model and perform various subsequent actions (e.g., notifications and/or updating of the machine learning model). The system 100 includes the stream filtering component 102, the triggering event detector 104, the insight generator 106, the journaling component 108, the publishing proxy 112, the model and dataset monitoring component 114, the retrospective component 116, the model updating component 117, and storage 125, each of which are communicatively coupled via the network(s) 110. The network(s) 110 may include, without limitation, one or more secure local area networks (LANs) or wide area networks (WANs). In some embodiments, the network(s) 110 is a secure network (e.g., a LAN) associated with a facility such as a healthcare facility. In some embodiments, the secure network requires that a user log in and be authenticated in order to send and/or receive information over the network.

The stream filtering component 102 is generally responsible for mapping one or more subsets of stream data to one or more machine learning models that need the corresponding data to make predictions. "Stream data", "streamed set of data" and the like, as described herein, refers to data that is continually produced, generated, and/or received (e.g., in near real-time) by one or more data sources (e.g., as opposed to batched data that is processed every 24 hours). For example, steam data can be Internet of things (IoT) data received from various sensors, server and security logs, real-time advertising data, click-stream data from apps and websites. In some embodiments, the stream data includes unstructured, semi-structured, and/or structured data in the form of multiple records (e.g., thousands or millions). Streaming data is typically processed sequentially and incrementally on a record-by-record (e.g., tuple-by-tuple) basis or over one or more sliding time and/or tumbling windows. Such windows are data objects that move across continuous streaming data, splitting the data into finite sets. Finite windows are helpful for operations such as aggregations, joins, and pattern matching. In a sliding window, for instance, tuples are grouped within a window that slides across the data stream according to a specified interval. For example, a time-based sliding window with a length of ten seconds and a sliding interval of five seconds contains tuples that arrive within a ten-second window.

In a tumbling window, tuples are grouped in a single window based on time or count. A tuple belongs to only one window, in some embodiments. For example, consider a time-based tumbling window with a length of five seconds. The first window (w1) contains events that arrived between the zeroth and fifth seconds. The second window (w2) contains events that arrived between the fifth and tenth seconds, and the third window (w3) contains events that arrived between tenth and fifteenth seconds. The tumbling window is evaluated every five seconds, and none of the windows overlap.

In some embodiments, the stream filtering component 102 specifically maps the streamed data to the specific inputs required by machine learning models in order to produce "raw feature" datasets useable by a particular machine learning models that have already been deployed (e.g., trained, tested, and put in production). For example, some embodiments use ontological structures, network graphs, or other data structures that map incoming stream data to particular machine learning models, which is described in more detail below. This allows the specific stream data to be parsed and mapped to the machine learning models that need the specific data.

The triggering event detector 104 is generally responsible for detecting a triggering event in data (e.g., the streaming data filtered by the stream filtering component 102) in preparation for generating an insight. In some embodiments, each of the components within the system 100 are program modules that call or receive programmatic calls to execute functionality. For example, in some embodiments, in response to the stream filtering component 102 performing its functionality, it calls the triggering event detector 104 to listen for triggering events.

A "triggering event" is any event that triggers or causes an estimate or prediction to be generated by one or more machine learning models and/or other intermediate steps (e.g., store data to a computer object, such as a journal). For example, in some embodiments, the triggering event is a synchronous request for an insight. A "synchronous request" blocks a client request until some operation completes. For example, the synchronous request can be a Hyper Text Transfer Protocol (HTTP) request that initially blocks a machine learning model request for a prediction by (1) storing the request in a journal, (2) provides the raw data included in the request for the prediction features, after which the synchronous pipeline invokes or locates the appropriate machine learning model for the request, formulates the insights and stores to a journal, before finally un-blocking the request or responding to the HTTP request with the prediction or insight.

In some embodiments, the triggering event is a time-based event. A "time-based event" occurs when a particular clock time (e.g., 21 hundred hours) and/or time duration (e.g., 10 minutes) has met or passed a threshold. For example, a time-based event can be every 15 minutes, where machine learning model predictions are made every 15 minutes from a near real-time pipeline before being stored to a journal (also called "journaling") and published (e.g., via the publishing proxy 112).

In some embodiments, the triggering event is a data condition. A "data condition" refers to some logical condition that occurs in data, such as input data (e.g., the streamed data filtered by the stream filtering component 102) drifting outside of a threshold, the input data being of a specific type or coming from a specific source (e.g., as described with respect to FIG. 2), the input data meeting some value threshold (e.g., weather data indicates rain or snow, sensor data is meeting a particular reading level, etc.), and the like.

In some embodiments, the triggering event is an entity change event. An "entity change event" refers to a real-world status change over a threshold. For instance, an entity change event may refer to a particular status change of a patient. For example, the patient is changing from a labor and delivery unit to an Intensive Care Unit. In another example, information has been received that a patient's health status has changed from a first state (e.g., a healthy heart rate state) to a second state (e.g., the heart rate is over a threshold). In some embodiments, the entity change event causes such event to be journaled and a prediction to be generated.

The insight generator 106 is generally responsible for generating an insight. An "insight" includes one or more machine learning model estimates or predictions, and/or other contextual information or metadata. For example, an insight can include a prediction that patient John Doe will experience a change in health status based on existing streamlining data measured from sensors located on John Doe. The insight can additionally include additional helpful information, such as remedial steps to reverse or mitigate the change in health status, such as reminders to take X medication, the phone number of the doctor, and the like. In some embodiments, the insight generator 106 performs its functionality in response to the journaling component 108 and/or the triggering event detector 104 performing its functionality. For example, in response to the triggering event detector 104 performing its functionality, it can programmatically call the journaling component 108 and the insight generator 106 to perform its functionality.

The journaling component 108 is generally responsible for storing, to one or more computer objects, different events (e.g., streaming data, machine learning model predictions, etc.). A "computer object" as described herein refers to any suitable unit of information, such as a data structure (e.g., a hash map), a file, a data object, and/or a set of code/instructions. In some embodiments, a computer object is a journal data structure. A "journal" as describe herein refers to a structure that stores system events as individual records (i.e., an entry) in a time sequence that indicates the time the events occur. Accordingly, each entry is timestamped with data that indicates when the event occurred. In some embodiments, when data is written, it is first written to the journal before it is written to persistent storage (e.g., disk). In some embodiments, the journal reserves a contiguous portion of a disk to store the journal entries to disk. For instance, when an event occurs, the event is written as an entry to the journal, responsively, the corresponding dirty blocks are marked in main memory (e.g., Random Access Memory (RAM)) as "clean", and then all the changes or entries stored to the journal are applied to the contiguous space located on disk. In some embodiments, a journal is not memory, such as main memory. Main memory, for example, is likely to scatter data blocks across the disk such that there is no contiguous sequence of space unlike journals. In some embodiments, the entries within journals cannot be deleted without administrative access because they reflect all system events or changes that are subject to audits (e.g., to ensure no sensitive data is being stolen). In some embodiments, the journaling component 108 ingests batch and/or real-time streaming data and journals this data to a data lake of raw data stored in a key/value store (e.g., AMAZON S3).

In some embodiments, the journaling component 108 stores a streamed set of data to a first computer object (e.g., a journal) that records streaming events. In some embodiments, the journal component 108 alternatively or additionally stores a machine learning model estimate to the first computer object and/or a second computer object (e.g., a second journal) that records estimates of the particular machine learning model. In this way, anomalies can be detected, machine learning models can be retrospectively generated or analyzed, notifications can be sent, which is described in more detail below.

In some embodiments, the journaling component 108 additionally stores snapshots of machine learning model(s) as they exist at the time an entry was populated in a computer object. For example, in response to a set of streaming data being provided, via the model updating component 117, to an existing machine learning model to retrain the machine learning model (e.g., to create a new machine learning model), the journaling component 108 can take a snapshot of the existing machine learning model without the new streaming set of data being backfilled. Additionally, the journaling component 108 can take another snapshot of the new machine learning model after re-training with the new streaming set of data used for the new model. Such snapshot functionality can be used to derive machine learning models at various points in time, as described in more detail below with regard to the retrospective component 116.

The publishing proxy 112 is generally responsible for delivering insights generated by the insight generator 106 or other information (e.g., notifications, journal information) to consuming devices (e.g., cloud computing services or end-user devices). A "consuming device" as described herein is any suitable computing device corresponding to any suitable entity or service, such as a web server, a cloud node, an application server, or a user device. In an illustrative example, the publishing proxy 112 can deliver insights to consuming services, such as CareAware (for a Command Center Dashboard) or to a synchronization service that stores these insights for access via an insight service in support of services and user experience (UX) components. In some embodiments, the publishing proxy 112 additionally or alternatively renders notifications that specifically indicate the particular anomalies detected by the model and dataset monitoring component 114. In some embodiments, the publishing proxy 112 additionally or alternatively renders information populated by the journaling component 108 and/or information determined by the retrospective component.

The model and dataset monitoring component 114 monitors one or more machine learning models and/or the input data used (e.g., the stream data processed by the stream filtering component 102) by the one or more machine learning models for detecting one or more anomalies. In some embodiments, the model and dataset monitoring component 114 initiates its functionality in response to the stream filtering component 102, the insight generator 106, and/or the journaling component 108 performing its functionality. For example, in response to the stream filtering component 102 performs its functionality, it may programmatically call the model and dataset monitoring component 114, which triggers the mode and dataset monitoring component 114's functionality.

In some embodiments, the model and dataset monitoring component 114 detects anomalies based on predetermined rules, policies, or thresholds (e.g., as outlined in conditional statements). For instance, data scientists can provide, along with their model files, a definition of ranges of performance calculations and thresholds (e.g., Mean Absolute Precision Error (MAPE)>5), which can get stored to a journal and can trigger an alert via the publishing proxy 112 (e.g., email notifications to TEAMS channels, or text messages). In this way, trends that show that a model is routinely underperforming can be detected, allowing users to investigate, retrain, and/or re-deploy a model, for example.

An "anomaly" as described herein refers to a specific deviation in data beyond or outside of some threshold (e.g., a predetermined threshold indicated in a ruleset). For example, in some embodiments, the model and dataset monitoring component 114 detects whether there is data drift anomaly by determining whether there is a discrepancy between the quantity of patient visits (e.g., a range between 100 and 200) used to train a machine learning model and the quantity of new patient visits (e.g., a range between 20 and 80) post model deployment outside of a threshold (e.g., 50 visits or more). In these embodiments, the model and dataset monitoring component 114, can compare the input training data to the data (e.g., streaming data) received after deployment against the threshold. Likewise, in some embodiments, the model and dataset monitoring component 114 also detects a model drift anomaly. In some embodiments, the model and dataset monitoring component 114 programmatically calls the publishing proxy 112 in response to performing its functionality to render related information. For example, the publishing proxy 112 can publish or render, to a consuming device, a signal indicating that data drift was detected.

In some embodiments, the anomaly detected is model performance (e.g., accuracy, distance to the ground truth or loss, etc.). Model performance can be characterized as, "is the model predicting to the tolerances found acceptable for various precision, recall, and accuracy metrics. In some embodiments the anomaly detected is latency of data flow in near real-time. Latency can affect the usefulness of the prediction. For instance, if it is known that the data used as inputs to a machine learning model are lagging beyond a threshold quantity of time (e.g., from the time of data sampling or measurement to the time of journaling or prediction), then particular embodiments can detect that and notify a user. For example, the Emergency Department (ED) volume in four hours may be degraded because a source data stream is running 30 minutes behind its usual 2 minute latency.

In some embodiments, the anomaly detected by the model and dataset monitoring component 114 is bias in a machine learning model. For instance, certain embodiments can detect bias in socioeconomic status, race, gender, sexual orientation, age, ethnic group, and/or the like. In an illustrative example, particular embodiments might be applied to vectors representing: words used to describe symptoms by men and by women; or symptoms by different cultural or ethnic groups; outcome assessments by age group. Additionally, the different categories of bias can be used by any suitable application outside of a healthcare setting or application, such as a banking application, a social media application, a market forecasting application, and the like.

Various categories of bias may be seen where, for example, men and women (and/or members of different racial/cultural groups) use different words to describe their identical symptoms, certain words used by certain racial/cultural groups of patients have a particular clinical meaning, and the widespread regional differences in treatment choices, unrelated to clinical science. In each of these cases, there may be words (or feature vectors representing words) used in word embeddings that are unfavorably biased. Accordingly, various embodiments can detect these biases.

In some embodiments, the model and dataset monitoring component 114 detects bias by quantifying the amount of bias and/or identifies the target category subspace (e.g., direction) that defines the bias or lack thereof. Geometrically, bias can be captured by a category subspace in the word embedding (e.g., of a WORD2VEC model). In some embodiments, a "category subspace" corresponds to or defines at least two vectors (e.g., seed word pairs) that indicate a species of a category based on the input received by the word pair generator 204. In some examples, a category subspace B is defined by k orthogonal unit vectors B={b1, . . . , $b_k$} . . . . Where k=1, the category subspace can be a direction. In some embodiments, the projection of a vector v onto B can by made by $$vB = \sum_{j=1}^{k}(v.bj)bj.$$

There may be multiple category subspaces for the same category. In an illustrative example, for the category of "drug A", one category subspace may be vector "drug A"

and its generic equivalent "generic A." Another category subspace or direction of the same category may be the formal name of drug A and a formal name of the generic equivalent. In some embodiments, the system captures multiple category subspaces for the same category and determines which category subspace (i.e., the target category subspace) contains the most or the "direction" of bias. This can be calculated via any suitable method. For example, multiple category subspaces or pairs of words can be aggregated for a same category. When several category subspaces are combined, the target subspace denoted as $g \in \mathbb{R}^d$ is captured in the word embedding. This target subspace helps to quantify biases in word embeddings. Identifying category subspace can be understood using the following notation. A subspace B is defined by k orthogonal unit vectors $B=\{b1, \ldots, bk\} \subset$. In some embodiments, where k=1, the subspace is a direction. In some examples, the projection of a vector v onto B is denoted by $$vB = \sum_{j=1}^{k}(v.bj)bj.$$

In some embodiments, identifying a target category subspace includes the following algorithm. The inputs are: word sets W, defining set $D_1, D_2, \ldots D_n \subset W$ as well as embedding $\{\vec{w} \in \mathbb{R}^d\}_{w \in W}$ and integer parameter k≤1. Let $$\mu_i := \sum_{\vec{w} \in D_i} \vec{w}/|D_i|$$

be the way to define sets. Let the bias subspace B be the first k rows of the SVD(C) where $$C := \sum_{i=1}^{n} \sum_{\vec{w} \in D_i} (\vec{w} - \mu_i)^T (\vec{w} - \mu_i)/|D_i|$$

The output is identifying a target category subspace that captures the most bias or a threshold quantity of bias. For example, using the illustration above, the seed words Drug A and "generic A" may capture significantly more bias compared to the formal names of these drugs. Accordingly, these words may be used as the input for the biasing/de-biasing component 210. In some embodiments, a category subspace additionally or alternatively corresponds to two points or vectors of a particular category along an axis in vector space, as described in more detail below.

In some embodiments, the model and dataset monitoring component 114 captures category-neutral words. "Category-neutral" words are words or other character sequences that are or should be identical or similar over a threshold score. For example, Brand A drug and its generic equivalent may be in a category-neutral drug category if they are identical in every respect, except for cost. Conversely, Brand A drug and its generic equivalent are not category-neutral words if they differ in other aspects such as effectiveness of treatment, how they are introduced to the body, side effect differences, etc. In some embodiments, the model and dataset monitoring component 114 compares the distances between vector pairs, where a pair of words are of the same category (e.g., and the category contains the target subspace).

Distance alone is not always indicative of bias, which is why various embodiments identify category-neutral words. If a first seed vector is at a particular distance to a vector, but a second seed vector of the same category is at a difference distance, this indicates a bias. Conversely, if a first seed vector is a particular distance to a vector, and a second seed vector of the same category is at the same distance or distance inside of a threshold, this indicates non-bias or that a vector has not been biased enough. However, mere differences in vector scores alone do not always reflect a bias or lack thereof. For example, a generic drug may be further away from a health condition compared to a brand drug not necessarily because there is a bias, but because the generic drug may not be as beneficial in remedying the health condition compared to the brand drug. Accordingly, various embodiments of the present disclosure determine category-neutral words first before vectors are biased or de-biased.

Determining category-neutral words may occur via any suitable method. For example, the model and dataset monitoring component 114 may receive a selection from a subject matter expert (SME) indicating that words are category neutral. Alternatively or additionally, computing systems may make this determination by comparing various attributes of various words and determining how equivalent they are. For example, a computing system may perform data mining or other machine learning techniques where there are millions or thousands of data sources, such as books, journals, etc. in order to determine, for example, how similar treatment A of kids is compared to treatment A of the elderly community. If there are differences over a threshold score, the computing system may flag the words as not category neutral. Conversely, if the differences do not surpass the threshold score, the computing system may flag the words as category-neutral.

The retrospective component 116 is generally responsible for deriving historic data or machine learning models contained in one or more computer objects populated by the journaling component 108. The historical backfilling component 116-1 is generally responsible for defining a time-based historical set (e.g., a window) of data to be used as raw features for one or more machine learning models. In some embodiments, such historical data is not the data that the machine learning model was trained on but any data (e.g., streaming data) received post model deployment or training. For example, an Apache Beam process (e.g., included in the stream filtering component 102), running on Apache Flink, can perform a sequence of first subscribing to a set of streaming data types or streaming sources (e.g., clinical event data, weather data, etc.) in order to have a picture of data flowing into the system at time(n). Subsequently, historical backfilling component 116-1 initiates a "historical backfill" process to complete the loading of machine learning input data for those entities for time (n−1) backwards until sufficient data for the models' needs are present in the pipeline's memory, which gives a complete picture of the data that the model needs. In some embodiments, the model's "needs" are defined by a ruleset or programming logic. For example, if streaming data type X is mapped to a machine learning model, then the rule may be to obtain the last 10 days-worth of data.

In some embodiments, in response to this data being loaded, one or more triggers (e.g., data events, timers, query requests) will cause the model pipeline to prepare a qualified raw model dataset by, for example, getting the proper scope of the data, mapping it, and organizing it, which is used to pass to a model for transformation into model features, and resulting in predictions or insights being made by the model (e.g., via the insight generator 106), which can be returned and published to consuming devices of the insight.

In some embodiments, the historical backfill component 116-1 performs its functionality by reading a journal or querying for a journal entry data. For example, if a rule dataset indicates to read the past 22 hours-worth of stream data, then the historical backfill component 116-1 can read each timestamped entry in a journal that was inserted in the journal for the past 22 hours. In some embodiments, the historical backfill component 116-1 programmatically calls the publishing proxy 112 in response to performing its functionality to render or publish information, such as the specific streamlining data backfilled from a journal.

In some embodiments, the insight generator 106 performs its functionality in response to the historical backfilling component 116-1 performing its functionality. For example, the historical backfilling component 116 may derive a chunk of stream data for the past 5 sequential days, and then programmatically calls the insight generator 106 (e.g., the trigger detected by the triggering event detector 104), and the insight generator 106 can make estimations or predictions, via a machine learning model, based on the input of the past 5 sequential days of information.

The model derivation component 116-2 is generally responsible for deriving one or more machine learning models that are older relative to a new machine learning model(s) currently being used. In some embodiments, the model derivation component 116-2 derives these older models by calling for or reading one or more computer objects populated by the journaling component 108. For example, user input may be received by the model derivation component 116-2 to publish a machine learning model as of X date. Consequently, the model derivation component 116-2 may publish or derive the old machine learning model (e.g., and consequently remove a new model) by reading an entry that includes the X data.

Deriving older machine learning models has utility and various purposes. For example, if a health-related pandemic occurred at time 1, and data drift started to therefore occur after time 1, it may desirable to start using the new data on the already-trained/deployed model in order to have the model more closely fit the new data. However, at time 2 (subsequent to time 1), the pandemic may be over and there may be no more data drift (e.g., because patient volumes are back up to normal levels). Accordingly, instead of using the new model with the new pandemic-related data, users may desire to use older models that more closely reflect the data at the pre-pandemic time before time 1. Therefore, embodiments can re-play or re-use the older models that reflect pre-pandemic data.

The model updating component 117 is generally responsible for updating a deployed machine learning model or generating a new machine learning model based on new input data received after model deployment. For example, based at least in part on the detection of an anomaly via the model and dataset monitoring component 114, the data stream (e.g., filtered by the steam filtering component 102) and/or the estimate generated by a machine learning model is fed to the trained machine learning model to update the model. In another example, the model updating component 117 can pass the newly received data (e.g., the stream data filtered by the stream filtered component 102) back to a deployed model, which causes the model to retrain using the newly received data. In some embodiments, the model updating component 117 "backfills" an old model (e.g., any model indicated in a journal) with a new model or its data. For example, some embodiments backfill an older machine learning model with a new machine learning model (or a stream of real-time inputs of a new machine learning model).

In some embodiments, subsequent to the updating of the trained machine learning model by the model updating component 117 (which causes a new model to be generated), the model derivation component 116-2 reads one or more computer objects populated by the journaling component 108 to derive an older machine learning model before it was updated via the mode updating component 117. In response to this reading, the model updating component 117 can evaluate the new machine learning model against the training learning model. For example, the model updating component 117 can determine the distance of a prediction of the new model verses the old model to the ground truth indicated at training time. And based on the evaluating, some embodiments cause one of the machine learning models (either the new or old one) to be deployed (or a notification may be rendered indicating as much, via the publishing proxy 112). For example, if the loss, via a loss function, is less for a new prediction based on its distance to a ground truth relative to an old prediction for a model, then the new machine learning model can be selected for deployment (and the old machine learning model is excluded from being deployed). Evaluating can alternatively or additionally including the input data of old machine learning models versus new ones, such as the amount of data drift. Accordingly, for example, old machine learning models can be selected for machine learning model deployment if there is relatively less data drift than new machine learning models.

In some embodiments, the model updating component 117 includes an operational API over a set of services, which is used to define and manage the model lifecycle. In operation, the model updating component 117 can test model changes retrospectively (e.g., via querying journal data structures), deploy machine learning models in silent mode (e.g., make model predictions that are not surfaced or published to a consuming device, but which can be stored to computer objects to detect anomalies or determine whether they should actually be deployed). In some embodiments, the model updating component 117 retrospectively backfills a new model version's insights to insight consuming devices who want to update prior insights in their local stores.

In some embodiments, the system 100 is included in a Cerner Machine Learning Ecosystem (CMLE), which is an end-to-end, cloud-native data science platform used to provide machine learning predictions to clinical, financial, and operational applications, which is built upon Amazon Web Service (AWS) cloud infrastructure. In these embodiments, various services are used to ingest high-volume batch and real-time streaming sources, journaling of ingested data to a data lake stored in key/value stores (e.g., Amazon S3), and streamed to processing components through various queuing and middleware technologies (e.g., SQS, SNS, AWS Lambda and Kinesis), journaling of machine learning predictions, as well as publishing services to deliver these predictions or insights to various consumers (e.g., consuming devices) of predictions, and processing patterns to allow interactive access to models through synchronous mechanisms that cohere with the journaling and model deployment approaches.

Figure 2B:
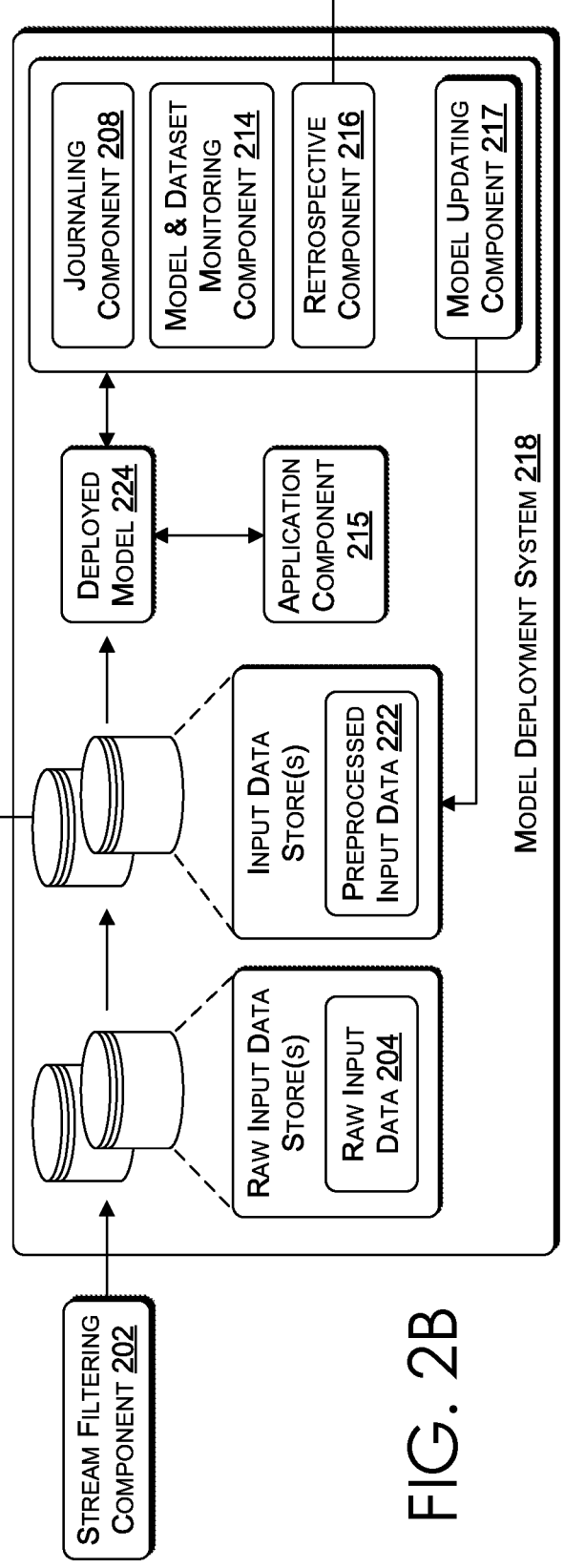
FIG. 2B is a schematic diagram illustrating an example model deployment system, according to some embodiments of the present invention.

With reference to FIG. 2A and FIG. 2B, reference to input data or data points may include raw training data 204, training data 206, raw input data 220, and/or preprocessed input data 222. Reference to output data may include data output by a trained machine learning model 210 and/or a deployed model 224 (e.g., the same machine learning model as 310, except deployed in a production environment) used to make predictions on the input data. Reference to performance may include the performance of the trained model 210 and/or the deployed model 224. The deployed model 224 may refer to the trained model 210 in a deployed environment of a computing system and/or application.

Referring now to FIG. 2A, a schematic depiction is provided illustrating an example model training system 203 in which some embodiments of the present disclosure may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The model training system 203 may include, among other things, a raw training data store(s) including raw training data 204, a training data store(s) including training data (e.g., after preprocessing the raw training data 204), a training component 208, and a trained model 210. The model training system 202 (and the components and/or features thereof) may be implemented using one or more computing devices, such as the one or more servers 1202 of FIG. 12.

The raw training data 204 may include any type of raw data that may be used by the training component 209 to generate the trained model 210. The raw training data 204 may be collected, generated, and/or obtained from any number of sources, such as files, databases, data stores, sensors, and/or other sources of structured, semi-structured, or non-structured data. In some examples, the raw training data 204 may be used directly by the training component 209 (e.g., without preprocessing), such as when the training component 209 is training a 2-layer neural network that outputs a word embedding. In such examples, the training data store(s) and the accompanying training data 206 may not be included in the model training system 202. In some examples, a combination of the raw training data 204 and the training data 206 may be used by the training component 209 to generate the trained model 210. In other examples, the training component 209 may only use the training data 206 for generating the trained model 210. In other words, the raw training data 204, the training data 206, or a combination thereof may be used by the training component 209 to generate the trained model 210.

The training data 206 may include the raw training data 204 after preprocessing. For example, data preprocessing may be performed by the model training system 202 to convert the raw training data 204 into a clean (e.g., useable) data set (e.g., the training data 206). For example, the raw training data 204 may be collected, generated, and/or obtained in a raw format, which may not be feasible, effective, or usable by the training component 209 for generating the trained model 210. In addition, the raw training data 204 may include inaccurate or missing data (e.g., as a result of gaps in data collection, mistakes in data entries, technical problems with sensors, such as biometric sensors, and the like), noisy data (e.g., erroneous data or outliers), and/or inconsistent data (e.g., duplication of data, human data entry errors, mistakes in codes, etc.).

During preprocessing, the raw training data 204 may undergo various processes, such as data cleaning, data integration, data scaling, normalization, data transformation, data reduction, and/or the like. For example, when the raw training data 204 includes inaccurate or missing data, the rows with missing data may be ignored (or deleted) when generating the training data 206 (in examples where the number of missing values is not too large), the missing data may be manually filled (in examples where the number of missing values is not too large to create an unreasonable task), and/or the missing values may be filled using computed values. For example, to fill the missing values using computed values, the mean, mode, or median of the existing raw training data 204 could be used in place of the missing values. As another example, a machine learning model can be implemented to generate predictive values for the missing values of the raw training data 204.

When the raw training data 204 includes noisy data, the data preprocessing may include data binning, clustering, employing a machine learning model, and/or manual removal. For example, substantially continuous data from the raw training data 204 can be grouped together into a smaller number of "bins" (e.g., if the raw training data 204 includes every age from 0-100, the ages may be "binned" into groups of ages at five year intervals). As another example, similar data may be grouped together (e.g., into the same cluster or class), and/or a machine learning model (such as a regression algorithm) may be used to smooth the raw training data 204. In some examples, the noisy data can be deleted manually.

In some examples, after preprocessing, the raw training data 204 (and/or the training data 206) may undergo data wrangling (or data munging). For example, the training component 209 may use data wrangling during the training process of generating the trained model 210. Data wrangling may be used to transform and/or map the raw training data 204 into a different format that is more appropriate and/or valuable for downstream purposes (e.g., analytics). For example, as the training component 209 is training the model (e.g., after one or more iterations), a different format for the one or more types of the raw training data 204 (and/or training data 206) may be determined to be more suitable for downstream purposes than the format that is currently being used. By reformatting the raw training data 204 (and/or the training data 206), analysis of the input data, output data, and/or performance of the trained model 310 (and/or the deployed model 224 of FIG. 2B) may be more effective. In an example illustration, a natural language word can be changed to a real number (e.g., 0 or 1) to be represented as a feature value in vector space.

The training component 209 may use the raw training data 204 and/or the training data 206 to generate the trained model 210. Although the training component 209 of FIG. 2A includes a general illustration of a neural network, this is not intended to be limiting. For example, the training component 209 may be used to train any type of machine learning model, such as machine learning models using linear regression, logistic regression, decision trees, support vector machine (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, long/short terms memory, Hopfield, Boltzmann, deep belief, deconvolutional, generative adversarial, liquid state machine, etc.), and/or other types of classifier, regression, or clustering machine learning models.

The trained model 210 may be generated by the training component 209 using the raw training data 204 and/or the training data 206. Once it is determined that the trained model 210 has acceptable accuracy (e.g., the loss or distance is acceptable based on a loss function), the trained model 210 may be deployed (e.g., as the deployed model 224). The determination that a trained model 210 has acceptable accuracy or confidence may include a threshold accuracy, such as, for example and without limitation, 80%, 90%, 98%, etc. The threshold accuracy may be predefined by the model training system 202, or may be user defined.

In some embodiments, the training by the training component 209 includes changing an embedding or orientation of one or more vectors in feature space. In some embodiments, the training includes learning an embedding (e.g., a precise coordinate or position) of one or more vectors. Learning an embedding may include learning the distance between two or more vectors based on feature similarity of values between the vectors. For example, after a first round or set of rounds of training, it may be unknown which of the extracted features are important for taking on a certain embedding position. Accordingly, each feature may take on equal weight (or close to equal weight within a threshold, such as a 2% changed weight) such that all of the vectors are substantially close or within a distance threshold in feature space. However, after several rounds of training or any threshold quantity of training, these same feature vectors may adjust or change distances from each other based on the feature value similarity. The more features of two vectors that match or are within a threshold value, the closer the two vectors are to each other, whereas when features do not match or are not within a threshold value, the further away the two vectors are from each other.

In some embodiments, the model training system 203 represents an auto machine learning (i.e., "autoML") system. AutoML (e.g., AutoWEKA) systems automate the end-to-end process of applying machine learning to real-world problems (as opposed to requiring humans to perform data preparation, feature engineering, selection, etc.). AutoML aims to reduce or eliminate the need for skilled data scientists to build machine learning and deep learning models. Instead, an AutoML system allows users to provide training data (e.g., labeled data) as input and receive an optimized model as output. AutoML typically covers the complete pipeline from the raw dataset (e.g., raw training data 204) to the deployable machine learning model (e.g., 224). For example, one or more of the following processes can be automated: data preparation (e.g., task detection of regression, classification, or clustering problem), feature engineering (e.g., feature selection, transfer learning, etc.), model selection, hyperparameter optimization, selection of evaluation metrics (e.g., loss function), pipeline selection under time and memory constraints, problem checking (e.g., leakage detection), analysis of results obtained. In an illustrative example, the preparing of the training data 206 can be automated, the training component 209 can be automated, and the selection of the trained model 210 can be automated.

Referring now to FIG. 2B, a schematic depiction is provided illustrating an example model deployment system 218 in which some embodiments of the present disclosure may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The model deployment system 218 may include, among other things, a raw input data store(s) including raw input data 220 (which is provided via the stream filtering component 202), an input data store(s) including preprocessed input data 222 (e.g., after preprocessing the raw input data 220), the deployed model 224, and the application component 215. In some examples, the model training system 203 and the model deployment system 218 may include separate or distinct components. In addition, as described herein, in some examples the trained model 210 may be the same as the deployed model 224, while in other examples, the trained model 210 may be used to generate the deployed model 224. The model deployment system 218 (and the components and/or features thereof) may be implemented using one or more computing devices, such as the one or more servers 1202 of FIG. 12.

As mentioned above, the deployed model 224 may correspond to the trained model 210 after the trained model 210 has been deployed in a computing system and/or application 215 (e.g., and has an acceptable level of loss). In particular, predictions made using the deployed model 224 may be used to power downstream applications and/or services (e.g., the application component 216).

The raw input data 220 may be similar to the raw training data 204, except that the raw input data 220 is input into the deployed model 224. For example, the raw input data 220 may include any type of raw data that may be input into the deployed model 224 to generate output data. The raw input data 220 may be collected, generated, and/or obtained from any number of sources, such as files, services, databases, data stores, sensors, and/or other sources that the stream filtering component 202 has filtered. In some examples, the raw input data 220 may be used directly by the deployed model 224 (e.g., with no or minimal preprocessing), such as when the deployed model 224 is a neural network. In such examples, the input data store(s) and the accompanying preprocessed input data 222 may not be included in the model deployment system 218. In some examples, a combination of the raw input data 220 and the preprocessed input data 222 may be used by the deployed model 224 to generate the output data. In other examples, the deployed model 224 may only use the preprocessed input data 222 for generating the output data. In other words, the raw input data 220, the preprocessed input data 222, or a combination thereof may be used by the deployed model 224 to generate the output data.

The preprocessed input data 222 may include the raw input data 220 after preprocessing. For example, similar to described above with respect to the raw training data 204 of the model training system 203 of FIG. 2A, data preprocessing may be performed by the model deployment system 218 to convert the raw input data 220 into a clean (e.g., useable) data set (e.g., the preprocessed input data 222).

In some examples, after preprocessing, and similar to the raw training data 204 (and/or the training data 206) of the model training system 203 of FIG. 2A described above, the raw input data 220 (and/or the preprocessed input data 222) may undergo data wrangling (or data munging).

The deployed model 224 may be generated, at least in part, by the training component 209 of the model training system 202 using the raw training data 204 and/or the training data 206. As described above, the deployed model 224 may be the trained model 210, may be one of the trained models 210 (e.g., where A/B testing was performed), and/or may be the trained model 210 after additional accuracy checking, retraining, in-deployment training (e.g., continuous training during deployment), and/or the like. The trained model 210 may include one or more models, such A/B models that are tested.

The deployed model 224 and/or any component thereof (e.g., the raw input data 220 or the preprocessed input data 220), may be used by the journaling component 208, the model and dataset monitoring component 214, the retrospective component 216, model updating component 217, and/or the application component 215. In some embodiments these components represent the same functionality as described with respect to FIG. 1. For example, in some embodiments, the stream filtering component 202 represents the stream filtering component 102 of FIG. 1, the journaling component 208 represents the journaling component 108 of FIG. 1, the model and dataset monitoring component 214 represents the model and dataset monitoring component 114 of FIG. 1, the retrospective component 216 represents the retrospective component 116 of FIG. 1, and the model updating component 217 represents the model updating component 117 of FIG. 1.

The performance metrics of the deployed model 224 may be calculated similarly to the performance metrics of the trained model 210, described herein. In addition, by scoring performance metrics of the trained model 210 to performance metrics of the deployed model 224, the model deployment system 218 may automatically identify performance anomalies (e.g., via the model and data set monitoring component 112). For example, during deployment the deployed model 224 could receive additional updates or training and it may be desirable to ensure that the model still performs like the model did prior to deployment, in one or more respects.

In some embodiments, the journaling component 208 stores the raw input data 220, the preprocessed input data 222, and/or predictions made by the deployed model 224 to one or more computer objects (e.g., journals). In some embodiments, the journaling component 208 is additionally a part of the model training system 203 and also stores the raw training data 204, training data 206, and predictions made by the trained model 210 to one or more computer objects. Likewise, in some embodiments the stream filtering component 202 is a part of the model training system 203, such that it provides the raw training data 204.

In some embodiments, the model and dataset monitoring component 214 detects whether there are any anomalies in the raw input data 220, the preprocessed input data 222, and/or predictions made by the deployed model 224. In some embodiments, the model and dataset monitoring component 214 also exists in the model training system 203 to monitor the raw training data 204, the training data 206, and/or predictions made by the trained model 210.

In some embodiments, the retrospective component 216 (e.g., via the model derivation component 116-2) derives past models, such as the trained model 210 or other deployed machine learning models. For example, there may be a second deployed model generated in response to updating (e.g., via the model updating component 217) the deployed model 224. Accordingly, in some embodiments, the retrospective component 216 can inactivate or exclude the deployed model 224 from being deployed and deploy the new second model. However, after this new model has been deployed, the retrospective component 216 can derive the deployed model 224 to revive or re-deploy the mode (e.g., an exclude the new second model from being deployed).

In some embodiments, the model updating component 217 updates the trained model 210 by, for example, passing the preprocessed input data 222 to the pool of training data 208 so that the training component 209 may re-train on this data. In some embodiments, the raw input data 220 is alternatively or additionally passed back to the training component 209 to re-train the trained model 210. In some embodiments, the model updating component 217 additionally or alternatively derives (e.g., from a journal) predictions made by the deployed model 224 model and passes them to the training component 209 so that the trained model 210 can be updated based on these predictions.

In some embodiments, the model deployment system 218 represents an autoML. In an illustrative example, the receiving of the raw input data 220 can be automated, the preparing of the preprocessed input data 222 can be automated, the selection of the deployed model 224 can be automated, and the predictions made by the deployed model 224 can be automated.

Figure 3:
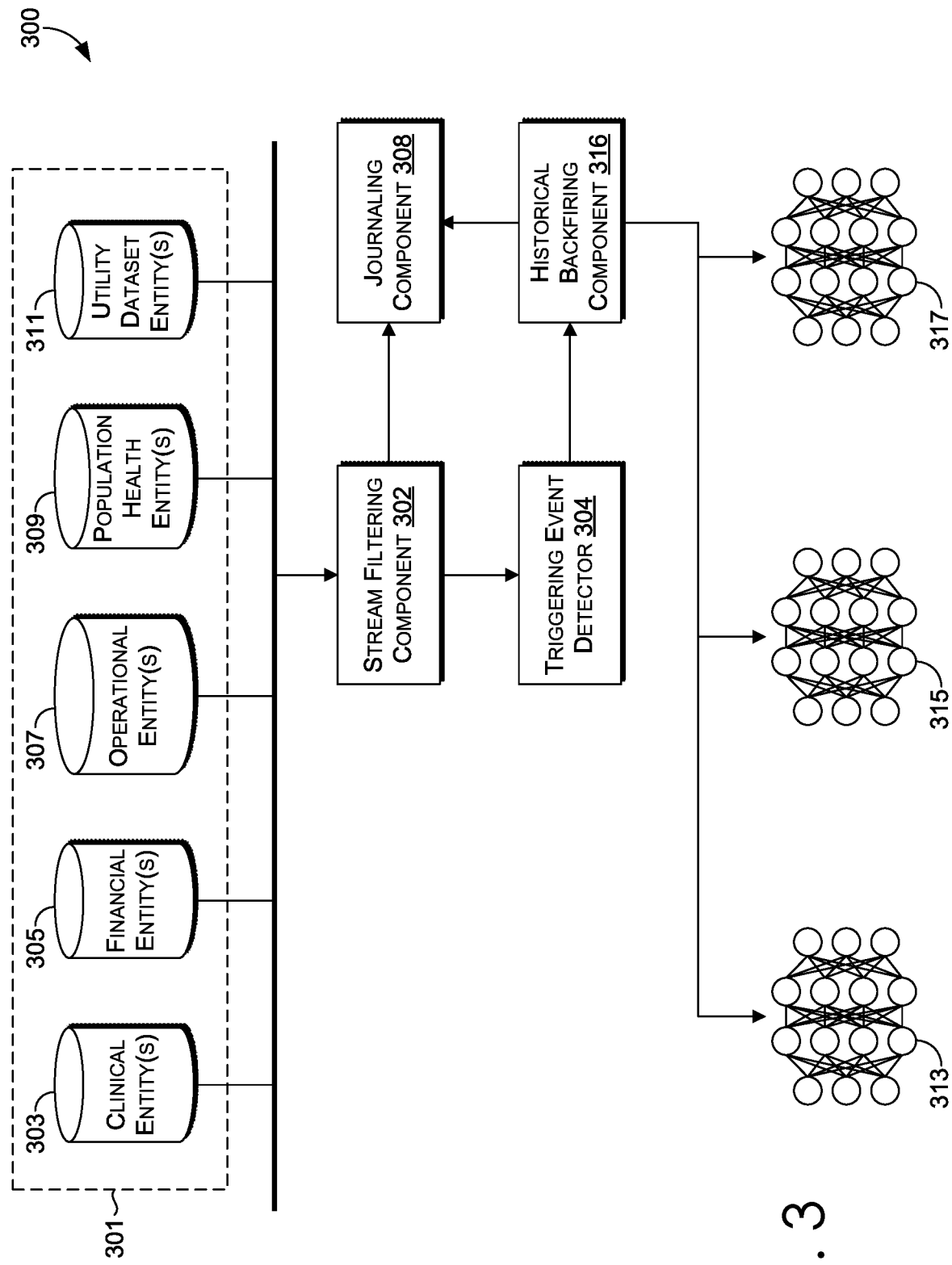
FIG. 3 is a block diagram of an example streaming environment that illustrates filtering stream data to different machine learning models, according to some embodiments.

FIG. 3 is a block diagram of an example streaming environment 300 indicating filtering streaming data to different machine learning models, according to some embodiments. In some embodiments, the stream filtering component 302 represents or includes the functionality as described with respect to the stream filtering component 202 and/or 101 of FIG. 2 and FIG. 1 respectively. Likewise, in some embodiments, the triggering event detector 304 represents or incudes the functionality as described with respect to the triggering event detector 104 of FIG. 1. Likewise, in some embodiments, the journaling component 308 represents or includes the functionality described with respect to the journaling component 108 of FIG. 1 and/or 208 of FIG. 2. Likewise, in some embodiments, the historical backfilling component 316 represents or includes the functionality with respect to the historical backfilling component 116-1 of FIG. 1.

FIG. 3 illustrates that the stream filtering component 302 receives, as input, streamed data from the data sources 301, which includes one or more clinical entities 303, one or more financial entities 305, one or more operational entities 307, one or more population health entities 309, and one or more utility dataset entities 311. The stream filtering component 302 then filters the stream data by mapping (e.g., via a lookup table) identifiers located in the stream data to identifiers identifying one or more of the machine learning models 313, 315, and 317.

In an illustrative example of how this mapping is performed, the stream filtering component 302 can ingest and keep a copies of all streamed data from the data sources 301 in the cloud. The stream filtering component 302 can then generate a cached view of the data that is needed or specific to the particular model. For example, the model 313 may only be used for making clinical predictions, such as patient status and therefore needs real-time feeds indicative of patient status. Accordingly, the stream filtering component 302 can generate a cached view of all the data coming from the clinical entity(s) 302 (and exclude all other streamed data from the financial entity(s) 305, for example). Accordingly, the stream filtering component 302 listens to every change in the clinical entity(s) 302 data source (e.g., a data store) that is relevant for the model 313.

In some embodiments, the Stream filtering component 302 includes operations that are a part of an Extract, Transform, and Load (ETL) database job. As described herein, ETL jobs copy data from a source database (e.g., any of the data sources 301) and write the copied data to a target data store or warehouse in a suitable format. Specifically, for the "Extract" operation (a first database operation), data (e.g., raw data) is extracted or read from one or data sources (e.g., different types of databases). For the "Transform" operation (a second database operation), the read data is converted from its previous form (e.g., raw form) into the form it needs to be in so that it can be placed in another database. Transform occurs by using lookup tables, one or more rules, or combining the read data with other data. In an illustrative example of the Transform operation, several database tables can be joined. In another example, the Transform operation can additionally or alternatively clean, sort, validate, and/or prepare the read data. For the "Load" operation, the transformed data from the "Transform" operation is then written into a target data store. For example, the transformed data can be loaded into a data warehouse to keep it for future analysis (e.g., analyzing BIG data or data mining) and tracking trends.

The journaling component 308 stores the streamed data from the stream filtering component 302 into one or more journals. For example, because the model 313 needs clinical data from the clinical entity(s) 303, as flagged or indicated by the stream filtering component 302, the journaling component 308 may generate a first journal that includes the streaming data from the clinical entity(s) 303. Likewise, because the model 315 may need financial data from the financial entity(s) 305, as flagged or indicated by the stream filtering component 302, the journaling component 308 may generate a second journal that includes streaming data from the financial entity(s) 305. Accordingly, in some embodiments, the journaling component 308 receives an identifier identifying the machine learning model 313, 315, or 317 and the type of stream data (or entities) it needs from the stream filtering component 302, and generates one or more journals for each model 313, 315, and 317, depending on the data stream needs, as indicated from the stream filtering component 302. The journaling component 308 may then responsively populate the journals with all of the corresponding streaming data based on the type or entity (e.g., clinical entity(s) 303).

In response to the stream data being processed by the stream filtering component 302, the triggering event detector 104 listens for a triggering event (e.g., a particular time interval has elapsed). In various embodiments, the triggering event detector 304 detects triggering events based on one or more rules or policies associated with the model 313, 315, and 317. In this way, some or each triggering event may be different between the models 313, 315, and 317 and some the triggering event detector 314 may only detect triggering events for specific models (and not others). In some embodiments, the triggering event detector 304 is employed so that the models 313, 315, and 317 are not getting stream data all the time or in near real-time. In this way, data stores of the data sources 301 do not have to be continually queried to make predictions. Rather, a journal, for example, can be queried for stream data depending on the triggering event and/or other policy/rules. Such functionality can save on network latency costs (e.g., because network TCP/IP headers do not have to be populated for a request that traverses a network) and database management costs (e.g., because a database manager does not have to execute a query execution plan (e.g., cardinality and selectivity) to return the appropriate rows or values.

In response to the triggering event detector 304 detecting the triggering event, it programmatically calls or communicates, over a network with, the historical backfilling component 316. The historical backfilling component 316 responsively calls or communicates with the journaling component 308 to obtain a set of entries corresponding to a set of stream data based on the triggering event and/or some other policy or rule. For example, a policy may specify obtaining the last 10 minutes worth of entries in the journal for model 313. Accordingly, the historical backfilling component 316 then derives the last 10 minutes worth of entries.

In response to the historical backfilling component deriving information in the journal via the journaling component 308, it then passes the derived information, as input (e.g., raw data input) into the specific model that needs the data—model 313, 315, and/or 317—so that the model can make a prediction or estimate based on the set of data received from the historical backfilling component 316.

Described below are each of the data sources 301. It is understood that although the data sources 301 are specific, such as to healthcare, more or fewer types of data sources may exist. For example, the data sources 301 may alternatively or additionally include social media service entities that produce social media data (e.g., posts, pictures, etc.) of particular users, user devices (e.g., mobile phones) that produce text (e.g., SMS) data, images or photographs, and/or email servers that product user emails. In some embodiments, the data sources 301 represent data stores, such as databases, corpuses, files, or the like. In some embodiments, the data sources 301 additionally or alternatively represent individual services (e.g., cloud computing services) or nodes (e.g., an individual server computer). In some embodiments, each of the data sources 301 produce, to the stream filtering component 302, its data in real time or near real-time. The term "real time" includes any time frame of sufficiently short duration as to provide reasonable response time for information processing as described. Additionally, the term "real time" includes what is commonly termed "near real-time," generally any time frame of sufficiently short duration as to provide reasonable response time for on-demand information processing as described (e.g., within a portion of a second or within a few seconds). These terms, while difficult to precisely define, are well understood by those skilled in the art. For example, the clinical entity(s) 303 can produce sensor data in near real-time relative to the time the sensor sampled or extracted the sensor data.

The clinical entity(s) 303 produce any suitable data associated one or more clinical (e.g., hospital) sites. For example, this data may include clinical entity change events or (e.g., Millennium crawler entities), clinical ontology and mapping reference entities, and the like. For example, stream data from the clinical entity(s) 303 may be near real-time sensor measurements (e.g., from a pulse oximeter or heart rate monitor) of any biometric characteristics, such as heart rate, oxygen saturation level, temperature, stress levels (e.g., via skin conductance sensors), steps taken, and the like of a patient or user. This clinical data can be used by the machine learning model 313, for example, to predict a particular health status change (e.g., a patient is about to have a heart attack or stroke) based on the clinical data.

The financial entity(s) 305 produce any suitable financial data. For example, the financial data may include 837 claim information, insurance information, bank information, and the like. 837 claims or 837P (Professional) is the standard format used by health care professionals and suppliers to transmit health care claims electronically. A health care claim is what a doctor submits to an insurance company so they can get paid. It shows the medical services that were provided to a patient. Accordingly, the financial entity data can include all of the services provided to a patient that is streamed in near-real time to the stream filtering component 302. This financial data can be used by the machine learning model 315, for example, to predict what the most important 837 claim to work on or how likely the claim is to be paid on a particular day and/or for a particular patient. Practitioners, for example, would likely not work on or engage in a claim that they are not likely to be paid for. Other examples include the likelihood that an 837 claim will be denied based on patterns or of a particular insurance paying or not paying a particular claim, as indicated in the financial data from the financial entity(s) 305.

The operational entity(s) 307 produces entity staffing data (e.g., quantity and identity of the types of staff members that worked at a particular hospital on a particular day), patient data (e.g., quantity or volume of patient visits on a particular day or hospital day), and/or any other data associated with an entities day-to-day workflow. Such operational data may be used by the machine learning model 317, for example, in order to predict additional staffing needs on a particular day given historic staffing numbers and patients on the same day last year. An example of the operational data and predictions are made by CERNER CLAIRVIA information and predictions.

The population health entity(s) 309 produces any information contained in a healthcare patient chart, medical record, and the like. For example, the population health entity(s) 309 may produce longitudinal patient records. A longitudinal health record is an electronic medical record of patient health information generated by one or more encounters in any care delivery setting. In an illustrative example, the longitudinal health record may include doctor's notes, such as symptoms a patient reports experiencing (e.g., shortness of breath, pain, etc.), signs that a doctor observes (e.g., irregular gait pattern, irregular heartbeat, etc.), the date of the visit, the name of the patient, name of prescriptions prescribed, referral notes to other doctors, other patient history (e.g., drug use, medical condition data (e.g., asthma, alcohol use), and the like. Such data can be used by the machine learning model 313, for example, to predict opioid use for a particular patient, predict that a particular patient will experience health episodes (e.g., shortness of breath), predict that a patient will fall, and the like.

The utility dataset entity(s) 311 produces real-world environmental data. For example, weather data (e.g., temperature, precipitation, sunny/cloudy/rainy), pollen counts, air quality (e.g., all organized by latitude and longitude coordinates), and the like can be produced in near real-time to the stream filtering component 302. This environmental data (e.g., along with the data in the population health entity(s) 309) can be used by the machine learning model 315, for example, to predict whether a particular patient will experience allergic reactions based on patient chart history on a particular day and the particular pollen count. For instance, the higher the pollen count, the more likely a patient will experience allergies. In another example, based on the weather data, the patient volume at a particular hospital can be predicted.

Figure 4:
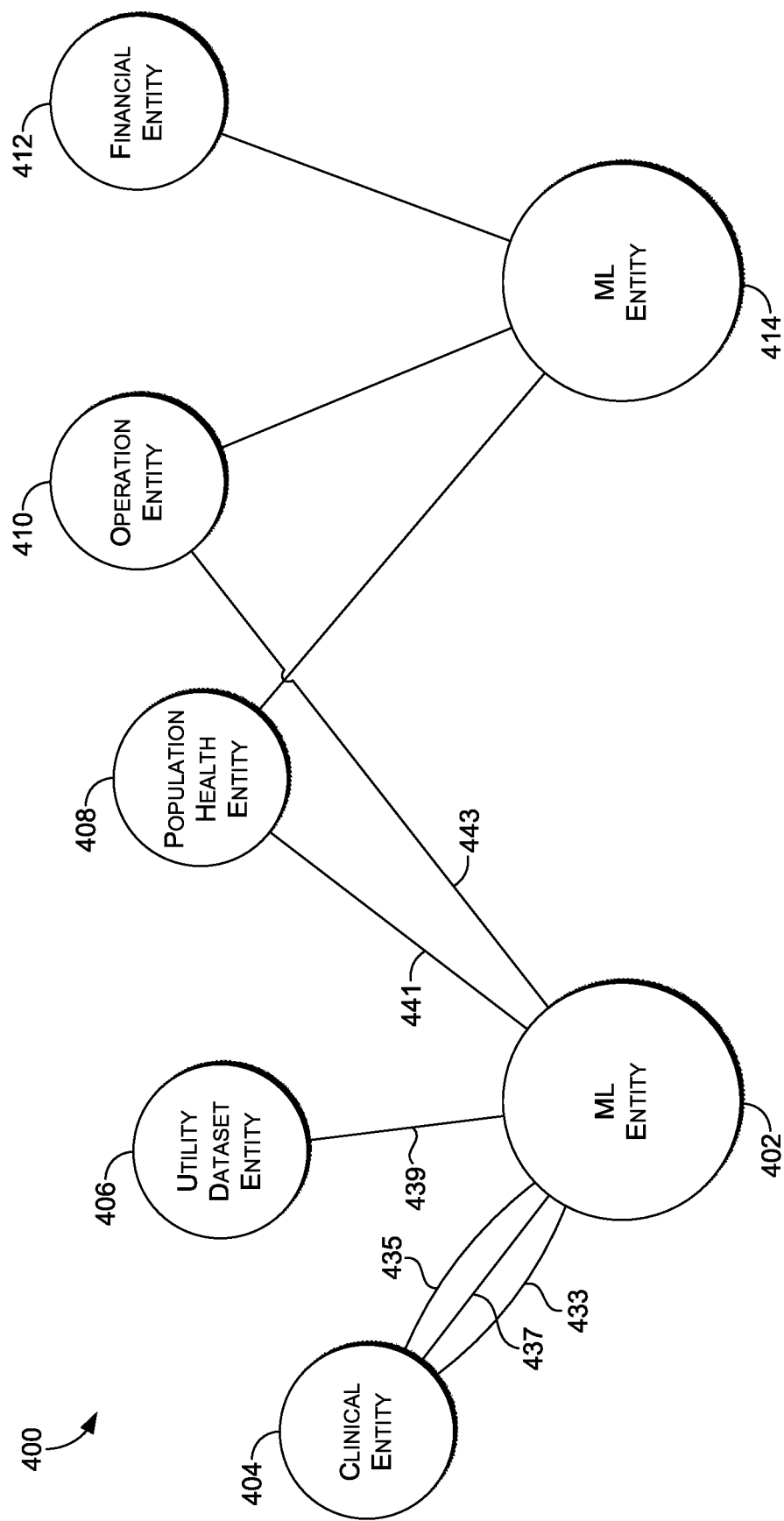
FIG. 4 is a schematic diagram of an example graph structure, according to some embodiments.

FIG. 4 is a schematic diagram of an example graph structure 400, according to some embodiments. In some embodiments, the graph structure 400 is used by the stream filtering component 102, 202, and/or 302 to map input data (e.g., stream data) to specific raw data inputs of particular machine learning models. In some embodiments, the graph structure 400 is a network graph. A network graph is a pictorial representation or visualization for a set of objects where pairs of objects are connected by links or "edges." The interconnected objects are represented by points termed "vertices," and the links that connect the vertices are called "edges." Each node or vertex represents a particular position in a one-dimensional, two-dimensional, three-dimensional (or any other dimensions) space. A vertex is a point where one or more edges meet. An edge connects two vertices. Specifically, for example, the graph structure 400 (e.g., an undirected graph) includes the nodes or vertices of—402, 404, 406, 408, 410, 412, and 414. The graph structure 400 further includes various edges linking the nodes, such as the edges 433, 435, 437, and 439.

The graph structure 400 specifically shows the relationships between input data (e.g., from the data sources 301 of FIG. 3) and particular machine learning models. In some embodiments, the edges represent or indicate that a particular machine learning model uses a specific kind of input data from a particular data source. For example, the particular machine learning model indicated by node 402 requires input data from a clinical entity represented by the node 404, a utility data set entity represented by the node 406, a population health entity represented by the node 408, and the operational entity represented by the node 410 based on the edges 435, 437, 435, 439, 441, and 443 all connecting to the ML ID node 402.

In some embodiments, the quantity of edges between particular nodes represents the strength of relationship between nodes. For instance, the more edges between two nodes, the more a particular machine learning model uses or depends on (e.g., via weight value) the data from the corresponding data source. For example, the relationship between node 402 and 404 is stronger than the relationship between node 402 and 404 based on there being three edges 433, 435, and 437 between nodes 402 and 404, as opposed to only 1 edge 439 being between node 404 and 406. Accordingly, the ML entity 402, for example, performs more predictions on or relies more on the clinical entity relative to the utility dataset entity. In other embodiments, the thickness of a single edge is indicative of the degree of relationship strength.

In some embodiments, the nodes 404, 406, 408, 410, and 412 represent corresponding entities, as indicated in the data sources 301. For example, the clinical entity node 404 may represent the clinical entity(s) 303, the utility dataset entity 406 may represent the utility dataset entity(s) 311, the population health entity node 408 may represent the population health entity(s) 309, the operational entity node 410 may represent the operational entity(s) 307, and the financial entity node 412 may represent the financial entity(s) 305 of FIG. 3.

In aggregate, the graph structure 400 indicates that a machine learning model (e.g., model 313), represented by node 402, needs or requires input data from a clinical entity, utility dataset entity, a population health entity, and an operational entity, all represented by the nodes 404, 406, 408, and 410 respectively. The graph structure 400 likewise indicates that a second machine learning model (e.g., model 315), represented by node 414, needs or requires input data from the population health entity, the operational entity, and the financial entity, all represented by the nodes 408, 410, and 412 respectively. The stream filtering component 102 can, for example, read metadata (e.g., a node identifier that identifies a node in the node structure 400) included in a stream of data from the clinical entity(s) 303, and then map the metadata to one of the nodes 404, 406, 408, 410, or 412, and responsively map the nodes to the machine learning model nodes (i.e., 402 and 414) via the corresponding edges. Based on the mapping, the stream filtering component 102 can present the necessary stream data as raw input into the corresponding machine learning model. In some embodiments, such metadata or node identifiers can be passed to other components that need to know what machine learning model the stream data belongs to, such as the triggering event detector 304, the journaling component 308, and/or the historical backfilling component 316, as described with respect to FIG. 3.

Figure 5:
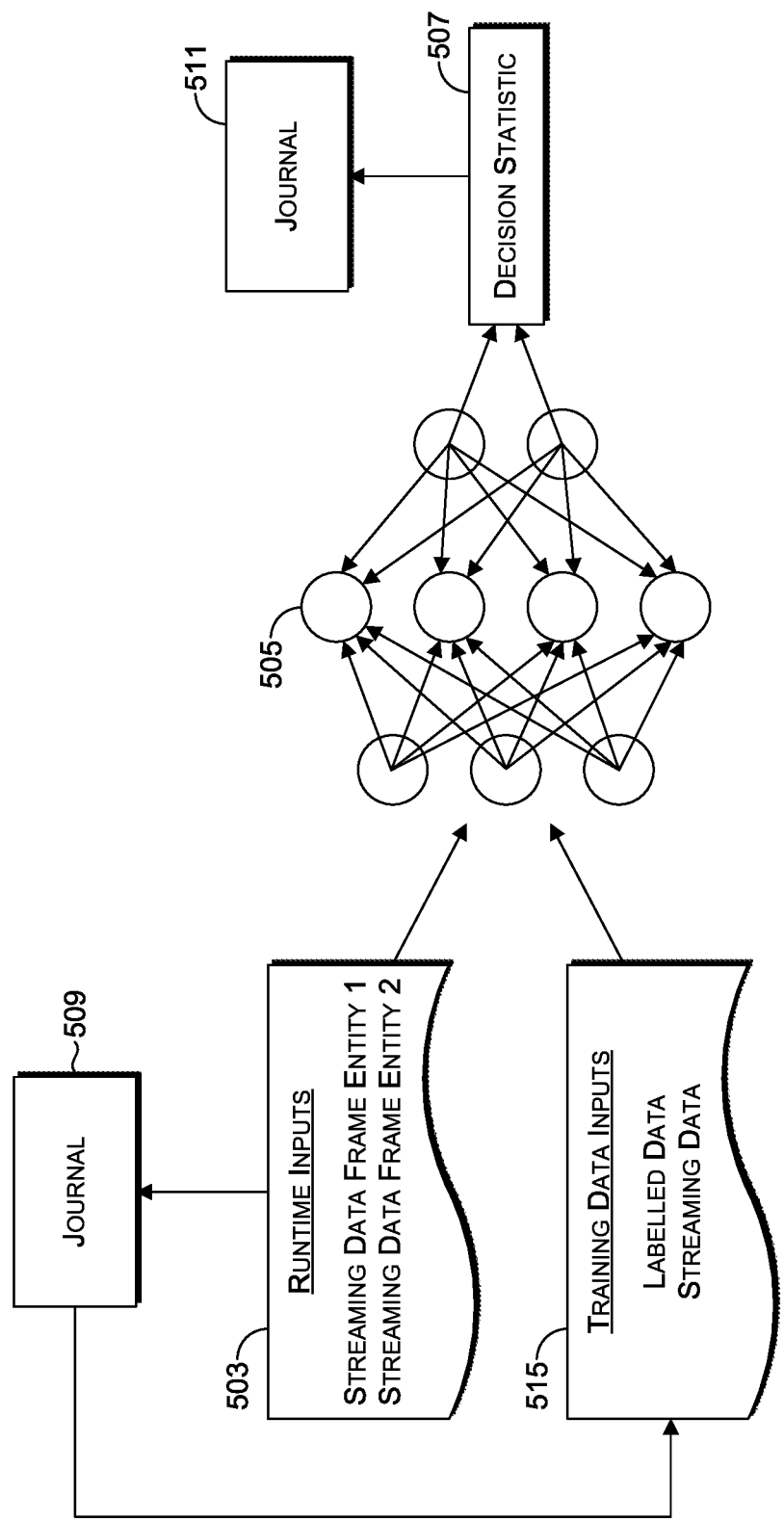
FIG. 5 is a schematic diagram illustrating how a decision statistic is generated using one or more machine learning models, according to some embodiments.

FIG. 5 is a schematic diagram illustrating how a decision statistic is generated using one or more machine learning models, according to some embodiments. In some embodiments, the one or more machine learning models 505 represents one or more of the machine learning models 313, 315, or 317 of FIG. 3. In some embodiments, the one or more machine learning models 505 represents the trained model 210 and/or the deployed mode 224 of FIG. 2.

FIG. 5 illustrates that one or more of the runtime input(s) 503 are fed or processed through the machine learning model(s) 505 to make a prediction, such as predicting patient volume at a hospital, predicting whether an insurance provider will pay an 837 claim, and/or patient health status. Although the runtime input(s) 503 indicate specific inputs, they are representative only and more or fewer inputs may be used. In some embodiments the runtime input(s) 503 represents and stream data from any of the data sources 301 of FIG. 3.

The one or more machine learning models 505 generates one or more particular decision statistic predictions 307 (e.g., a classification prediction of a classifier model, a clustering prediction of a clustering model, or a regression prediction for a regression model) given the runtime input(s) 503. Such machine learning model(s) 505 may be any suitable model of any suitable type. For example, such machine learning model(s) can be supervised or unsupervised and can be or include a neural network (e.g., a Convolutional Neural Network (CNN) or Siamese Neural Network), decision trees, random forests, support vector machine, Naïve Bayes, and or clustering (e.g., K-means clustering). Accordingly, although the machine learning model(s) 505 is represented as a neural network, it is understood that any suitable machine learning model (or combination of models) can alternatively or additionally be used.

In certain embodiments, the decision statistic(s) 507 may either be hard (e.g., membership of a class is a binary "yes" or "no") or soft (e.g., there is a probability or likelihood attached to the labels). Alternatively or additionally, transfer learning may occur. Transfer learning is the concept of re-utilizing a pre-trained model for a new related problem.

In some embodiments, the machine learning model(s) 505 converts or encodes the runtime input(s) 503 and/or training data input(s) 515 into corresponding feature vectors in feature space. A "feature vector" (also referred to as a "vector") as described herein includes one or more real numbers, such as a series of floating values or integers (e.g., [0, 1, 0, 0]) that represent one or more other real numbers, a natural language (e.g., English) word and/or other character sequence (e.g., a symbol (e.g., @, !, #), a phrase, and/or sentence, etc.). Such natural language words and/or character sequences correspond to the set of features and are encoded or converted into corresponding feature vectors so that computers can process the corresponding extracted features.

In various embodiments, the machine learning model(s) 505 learn, via training, parameters or weights so that similar features are closer (e.g., via Euclidian or Cosine distance) to each other in feature space. In some embodiments, this training is done in supervised manner using a loss function (e.g. Triplet loss or GE2E loss) in order to map similar features into one classification or cluster. Training can occur on any suitable training data input(s) 515, such as labelled data or stream data. In some embodiments, labelled data is used to create the ground truth. For instance, labeled data may correspond to a patient record labeled "heart disease" where the patient record includes several features or attributes associated with heart disease, such as body mass index (BMI), heart rate, family history, and the like.

Various embodiments can represent one or more feature vectors representing the input(s) 515 in vector space by aggregating (e.g. mean/median or dot product) the feature vector values to arrive at a particular point in feature space (e.g., an "embedded feature vector"). For example, in supervised learning contexts, a training component can receive several labelled documents, each label indicating that "John Doe experienced opioid overdose", where the document also contains various patient chart or other information known about John Doe. Embodiments, can then run the document with the corresponding label through the machine learning model(s) 505 so that different feature values and weights are learned according to the label. In this way, when documents are received, corresponding weights or features can be learned. For instance, the machine learning model(s) 505 can learn a pattern that opioid overdose is heavily associated with athletic persons, persons who have experience acute injuries, or the like.

In some embodiments, a training component (e.g., 209) of the machine learning model(s) 505 learns features from the training data input(s) 515 and responsively weights them during training. A "weight" in the context of machine learning represents the importance or significant of a feature or feature value for prediction. For example, each feature may be associated with an integer or other real number where the higher the real number, the more significant the feature is for its prediction. In some embodiments, a weight in a neural network or other machine learning application can represent the strength of a connection between nodes or neurons from one layer (an input) to the next layer (an output). A weight of 0 may mean that the input will not change the output, whereas a weight higher than 0 changes the output. The higher the value of the input or the closer the value is to 1, the more the output will change or increase. Likewise, there can be negative weights. Negative weights proportionately reduce the value of the output. For instance, the more the value of the input increases, the more the value of the output decreases. Negative weights may contribute to negative scores.

In another illustrative example of the training component, some embodiments learn an embedding of feature vectors based on learning (e.g., deep learning) to detect similar features between training data input(s) 515 in feature space using distance measures, such as cosine (or Euclidian) distance. For example, each training data input 515 is converted from string or other form into a feature vector where each value or set of values represents the individual features of a document in feature space. Feature space (or vector space) is a collection of feature vectors that are each oriented or embedded in space based on an aggregate similarity of features of the feature vectors. Over various training stages or epochs, certain feature characteristics for each input(s) 515 can be learned or weighted. For example, for a first document where opioid overdose is being predicted, the most prominent feature may be having an athletic background, whereas other features change considerably or are not present, such as whether a person is male or female. Consequently, parameters of the first pattern can be weighted (e.g., a node connection is strengthened to a value close to 1), which is indicative of the label taking on this feature (whereas other node connections representing the second set of symptoms are weakened to a value closer to 0). In this way, embodiments learn weights corresponding to different features such that similar features found in inputs contribute positively for predictions.

In some embodiments, learning or weighting includes changing an embedding in feature space of a feature vector representing a page as more training epochs occur. For example, after a first round or epochs of training, it may be unknown which of the extracted features are important for taking on a certain classification or prediction. Accordingly, each feature may take on equal weight (or close to equal weight within a threshold, such as a 2% changed weight) such that all of the input feature vectors are substantially close or within a distance threshold in feature space. However, after several rounds of training or any threshold quantity of training, these same feature vectors may adjust or change distances from each other based on the feature value similarity. The more features of two feature vectors that match or are within a threshold value, the closer the two feature vectors are to each other, whereas when features do not match or are not within a threshold value, the further away the two feature vectors are from each other.

In various embodiments, subsequent to the machine learning model(s) 505 training on the training data input(s) 515 (and/or testing), the machine learning model(s) 505 (e.g., in a deployed state) receives the runtime input(s) 503. In various embodiments, In some embodiments, the input(s) 503 are automatically converted to one or more feature vectors and mapped in the same feature space as vector(s) representing the training data input(s) 515. Responsively, some embodiments determine a distance (e.g., a Euclidian distance) between the one or more feature vectors and vectors representing the training data input(s) 515, which is used to generate the decision statistic(s) 507.

FIG. 5 also represents the information that can be stored to a journal and how that information can be used to tune the machine learning models(s) 505 or generate a new one. In some embodiments, the journal 509 and 511 represents what is populated by the journaling component 108 of FIG. 1. For instance, the journaling component 108 can journal the runtime inputs used by the one or more machine learning model(s) 505 to the journal 509. In response to the decision statistic 507, the journaling component 108 can likewise store the decision statistic 507 to the journal 511. For example, the prediction of a 95% probability that the patient volume for next Monday will be around 200 patients can be populated to the journal 511. One or more of the entries within the journal 509 can be passed to the training data inputs 515 so that the machine learning model(s) 505 can retrain, as described herein with respect to the model updating component 117 of FIG. 1. Likewise, some embodiments publish or cause presentation of the entries located in the journal 411 and/or use the information to update the machine learning model(s) 505, as described above with respect to the model updating component 117.

FIG. 6 illustrates an example journal data structure 600, according to some embodiments. In some embodiments, the journal data structure is the computer object generated or populated by the journaling component 108 of FIG. 1, the journaling component 208 of FIG. 2, and/or the journaling component 308 of FIG. 3 In some embodiments, the journal data structure 600 represents the journal 509 of FIG. 5.

The journal data structure 600 includes at least five attributes—i.e., model ID, entry ID, timestamp, payload input data, and metadata Y—and at least four entries or records (identified under the entry ID attribute as 1, 2, 3, and 4) that are ordered or stacked according to time or the "timestamp" attribute. In various embodiments the journal structure 600 represents the structure that is populated when stream data or other input data is received.

The "model ID" attribute corresponds to the identity of a particular machine learning model that needs the input data to make predictions. For example, as described above with respect to FIG. 3, the journaling component 308 can receive information from the stream filtering component 302 that indicates what model (e.g., model 313) needs the corresponding stream or other input data and responsively populate corresponding entries within the journal data structure.

The "timestamp" attribute refers to the date and time at which the input data was: received (e.g., by the journaling component 308), populated to the journal data structure 600, or measured/sampled (e.g., by a sensor associated with the clinical entity(s) 303). In some embodiments, timestamp data is used to generate a machine learning model estimate or prediction based on a triggering event or other policy/rule, as described in more detail herein.

The "payload input data" refers to the particular input or stream data values that have been measured or samples. For instance, entries 1, 2, and 4 indicate particular heart rate values in beats per minute (BPM). Additionally, entry 3 indicates specific patient symptoms A, B, and C (e.g., as obtained in near real-time via an electronic record). In some embodiments, the payload input data can include any of the data produced by any of the data sources 301.

The "metadata Y" attribute(s) can include one or more other sets of metadata. For example, in some embodiments, other meta data can be present, such as Mode, Bitmap, and transaction end blocks. An "Mode" can include permission information, a single indirect pointer that points to a disk block, which is in turn used as an index block, if the file is too big to be indexed entirely by direct blocks, a double indirect pointer that points to a disk block, which is a collection of points to disk blocks that are index blocks. These may be used if a file is too big to be indexed by direct and single indirect blocks. The Mode can also include a triple indirect pointer that points to an index block of index blocks. A bitmap block is a sequence of bits. Each bit represents a specific block (blocks bitmap) or inode (inode bitmap) in the block group. Transaction end blocks indicate the end of a transaction or entry.

In some embodiments, the model and dataset monitoring component 114 batch scans the journal data structure 600 (e.g., based on some policy, such as every 10 minutes) to detect an anomaly, as described with respect to FIG. 1.

FIG. 7 illustrates an example journal data structure 700, according to some embodiments. In some embodiments, the journal data structure 700 is the computer object generated or populated by the journaling component 108 of FIG. 1, the journaling component 208 of FIG. 2, and/or the journaling component 308 of FIG. 3 In some embodiments, the journal data structure 600 represents the journal 511 of FIG. 5.

The journal data structure 700 includes at least six attributes—i.e., model ID, entry ID, timestamp, ML predictions, model snapshot, and metadata P—and at least four entries or records (identified under the entry ID attribute as 1, 2, 3, and 4) that are ordered or stacked according to time or the "timestamp" attribute. In various embodiments the journal structure 700 represents the structure that is populated in response to a machine learning model making a prediction.

The "model ID" attribute corresponds to the identity of a particular machine learning model that makes the predictions indicated under the "ML predictions" attribute. The "timestamp" attribute refers to the date and time at which the prediction data was populated to the journal data structure 700, or the time at which an estimate or prediction was made. In some embodiments, the model updating component 117 uses this timestamp data to publish (e.g., via the publishing proxy 112) the set of predictions or otherwise feed them to a model to update the model based on some triggering even or other policy. For example, a policy may be to derive the last 5 minutes worth of predictions and publish them to a consuming device, which would include all of the entries 1 through 5.

The "ML predictions" attribute refers to the specific predictions the particular machine learning model has made ordered according to time. As described above, in some embodiments, timestamp data of the journal data structure 600 of FIG. 6 is used to generate a machine learning model estimate or prediction based on a triggering event or other policy/rule. For example, the triggering event detector 303 may detect a triggering event that specifies for a machine learning model to make a prediction based on the last 3 minutes worth of stream data received starting at 13:08 on 1-13-2021. Accordingly, at 13:08, the trigger event detector 304 may communicate with the historical backfilling component 316 to derive entries 1 through 4 within the journal structure 600. Based on ingesting this chunk of stream data in FIG. 6, the machine learning model (e.g., model 315) may predict that the patient is likely to experience a condition known as Tachycardia, given the steady rise in BPM from 13:05 to 13:08 and given the specific symptoms A, B, and C (e.g., shortness of breath, lightheadedness, and chest pain). Responsive to this prediction, the entry ID 1 of the journal data structure 700 of FIG. 7 can be populated, which indicates the prediction—that the patient is likely to experience Tachycardia.

The "model snapshot" attribute indicates a pointer value that points, in memory, to a location of where a machine learning model is stored and is also indicative of the specific makeup of the model. Model makeup, such as training data used to make predictions, weights, parameters, and the like can change from time to time. Accordingly, in response to any changes that are made to machine learning models (e.g., via the model updating component 117), the model can be stored to a separate memory location and then flagged with that location, which can be read by the journaling component 108 when predictions are made by the model. A model snapshot is thus indicative of the specific makeup of the model (e.g., training inputs and parameters) at the time the corresponding entries were populated in the journal structure 700. For example, the journal structure 700 indicates that the makeup of the machine learning model has the same value or is stored to the same memory location (0006) for the first three entries and then changes (to 0007) at entry 4.

As described herein with respect to the model derivation component 116-2, models can be derived retroactively from a current time for publishing or otherwise updating a model. For example, as illustrating in FIG. 7, the current time may be 8:04 on 1-14-2021, and the current deployed model is stored to 0007 location. However, various users may desire to go back in time to prior models. Accordingly, the model derivation component 116-2 can go back in time by accessing or reading entry 1 through 3. In various embodiments, the "metadata P" attribute of the journal data structure 700 contains similar or identical information as described above with respect to the "metadata Y" attribute.

In some embodiments, the model and dataset monitoring component 114 batch scans the journal data structure 700 (e.g., based on some policy) to detect an anomaly, as described with respect to FIG. 1.

Figure 8:
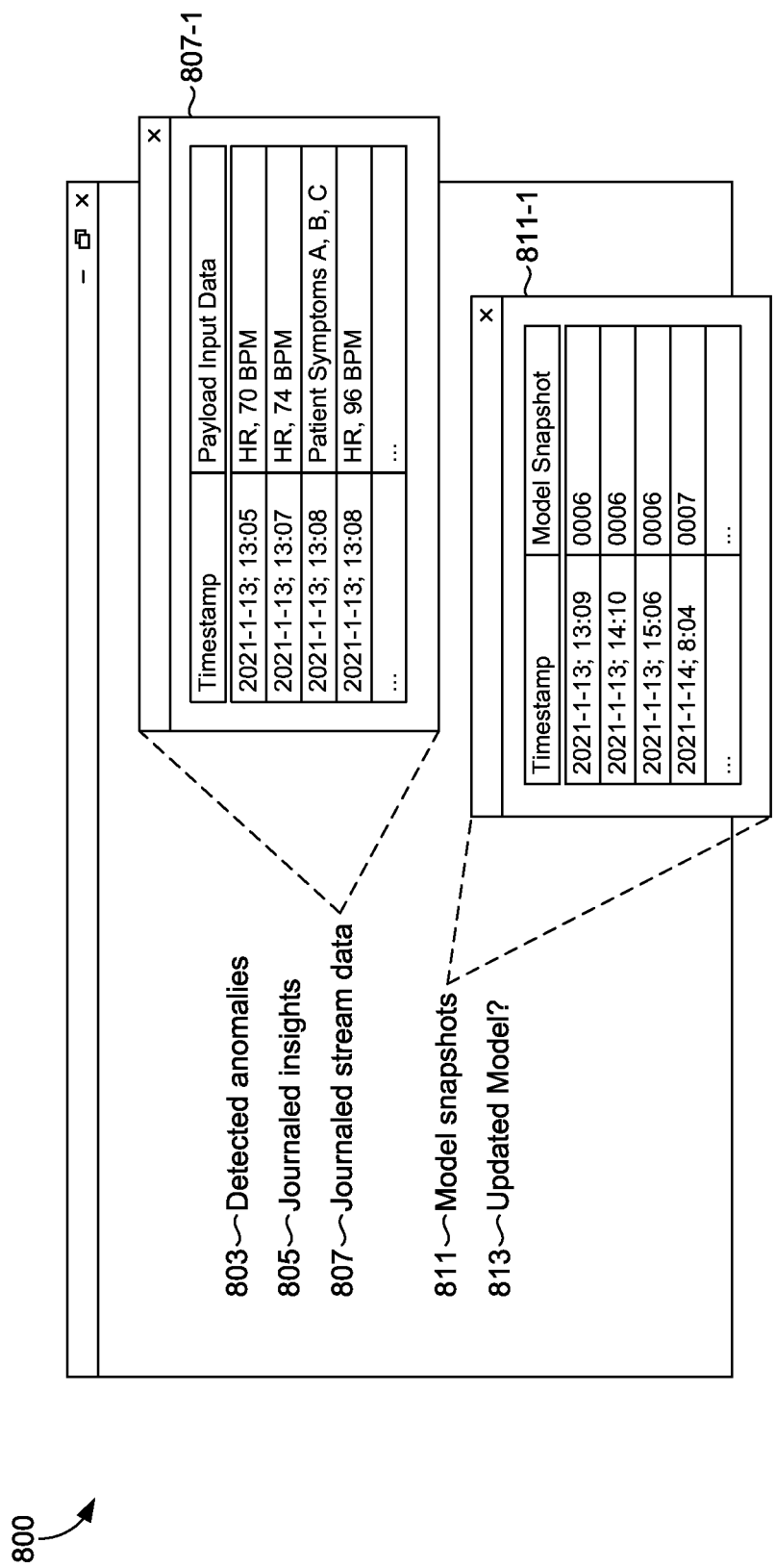
FIG. 8 is a screenshot of an example user interface, according to some embodiments.

FIG. 8 is a screenshot 800 of an example user interface, according to some embodiments. In some embodiments, the screenshot is produced or caused to be displayed by the publishing proxy 112 of FIG. 1. The screenshot 800 illustrates that a user can make various selections to view past data (e.g., predictions and stream data), update a machine learning model, or even view past machine learning models.

In response to receiving an indication that the user has selected the UI element 803 (e.g., a link), various embodiments can generate a list of anomalies (e.g., data drift at particular timestamps) that have been detected (e.g., via the model and dataset monitoring component 114). In response to receiving an indication that the user has selected the journaled insights UI element 805, some embodiments cause presentation of the insights generated by the insight generator 106. In performing this functionality, the journal (e.g., the journal data structure 700) can be queried to formulate the data. For example, some embodiments call the journaling component 108 to cause presentation of the "timestamp" values and the "ML predictions" values of FIG. 7. In response to receiving an indication that the user has selected the journaled stream data UI element 807, some embodiments cause presentation of the window 807-1, which lists the timestamp values and "payload input data" values of the journal data structure 600 of FIG. 6.

In response to receiving an indication that the model snapshots UI element 811 has been selected, some embodiments cause presentation of the pop-up window 811-1, which illustrates the timestamp values and model snapshot values of the journal data structure 700 of FIG. 7. In some embodiments, the window 811-1 is generated by deriving the corresponding information from the journal data structure 700 of FIG. 7. Some embodiments are able receive user selections of the timestamp or model snapshot values and responsively derive the corresponding models from memory. Some embodiments also allow users select whether to deploy the model snapshots for use in future predictions.

In response to receiving an indication that the user has selected the update model UI element 813, some embodiments update a machine learning model (e.g., via the model updating component 117). For example, some embodiments can process users' requests to train the model using new stream data, update the model using new predictions, completely disregard a trained model and generate a new model based on a set of historical input data, and the like.

Figure 9:
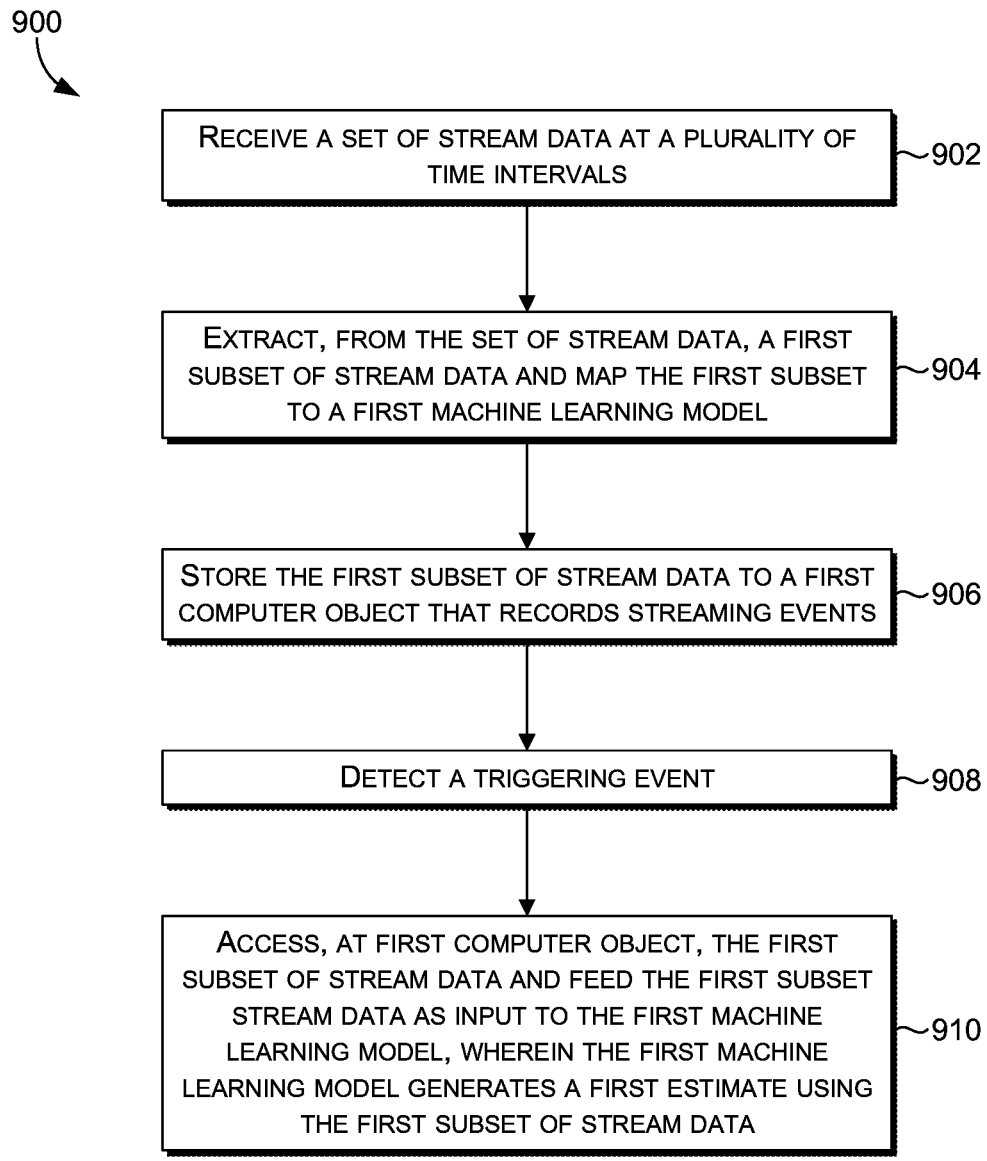
FIG. 9 is a flow diagram of an example process for causing a machine learning model to make a prediction based at least in part on detecting a triggering event, according to some embodiments.

FIG. 9 is a flow diagram of an example process for causing a machine learning model to make a prediction based at least in part on detecting a triggering event, according to some embodiments. The process 900 (and/or any of the functionality described herein) may be performed by processing logic that comprises hardware (e.g., circuitry, dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Such added blocks may include blocks that embody any functionality described herein. The computer-implemented method, the system (that includes at least one computing device having at least one processor and at least one computer readable storage medium), and/or the one or more computer storage medium as described herein may perform or be caused to perform the processes 900 and/or any other functionality described herein.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described. Accordingly, the scope of the invention is intended to be limited only by the following claims.

Per bock 902, a set of stream data is received at a plurality of time intervals (e.g., timestamps or clock times). Examples of this are described with respect to FIG. 3 where the stream filtering component 302 receives (e.g., continuously) stream data from each of the data sources 301 at various time intervals. For instance, the time intervals may correspond to the timestamps and payload input data indicated in the journal data structure 600 of FIG. 6. In some embodiments, the received data can be data alternative to (or in addition to) stream data, such as data chunks or TCP/IP packet data.

Per block 904, some embodiments, extract, from the set of stream data, a first subset of stream data and map the first subset of data to a first machine learning model. Examples of this are described with respect to the stream filtering component 102, 202, and 303 of FIGS. 1, 2, and 3 respectively. For example, the stream filtering component 302 can extract clinical entity data that originated from the clinical entity(s) 303 and map (e.g., via the graph structure 400 of FIG. 4), to the machine learning model 313. In some embodiments, the first machine learning model is a deployed machine learning model that has been trained and tested as described, for example, with respect to the deployed model 224 of FIG. 4. Some embodiments, additionally map a second subset of stream data of the set of stream data to a second machine learning model, and wherein a second estimate of the second machine learning model is made based at least in part on the mapping of the second subset of stream data. For example, referring back to FIG. 3, stream data from the financial entity(s) 305 can be mapped, via the stream filtering component 302, to the machine learning model 315.

Per block 906, particular embodiments store the first subset of stream data to a first computer object that records streaming events. Examples of this are described with respect to the journaling component 108, 208, 308, and the first computer object, for example, can be the journal data structure 600 of FIG. 6, where the journal data structure 600 includes a plurality of timestamped streaming events (e.g., the "payload input data").

Per block 908, a triggering event is detected. Examples of this detection is described with respect to the triggering event detector 104 of FIG. 1, and the triggering event detector 304 of FIG. 3. For example, the triggering event detected can be a synchronous request for the first estimation, a time-based event, a data condition, and an entity change event.

Per block 910, some embodiments access, at the first computer object, the first subset of stream data and feed the first subset of stream data as input to the first machine learning model. Responsively, the first machine learning model generates a first estimate (e.g., the decision statistic 507 of FIG. 5) using the first subset of stream data (e.g., via the runtime inputs 503 of FIG. 5). Some embodiments perform block 910 at least partially in response to the detecting of the triggering event and based at least in part on the mapping. For example, as described with respect to FIG. 3, the historical backfilling component 316 may communicate with the journaling component 308 to access a journal based on the triggering event detector 304 detecting a triggering event.

Some embodiments additionally store the first estimate to a second computer object that records estimates of the first machine learning model (e.g., the journal data structure 700 of FIG. 7). Responsively, some embodiments detect an anomaly with the first subset of stream data and/or the first estimate and then feed the first subset of stream data and/or the first estimate to the first machine learning model to update the first machine learning model based at least in part on the detecting of the anomaly. Examples of this are described with respect to the model updating component 117, 217 of FIG. 1 and FIG. 2 respectively.

Some embodiments additionally cause one or more notifications to be provided to a consuming device. For example the notifications can be at least one of, the detected anomaly the estimation, the subset of stream data, and data in the first computer object (or second computer object). Examples of this are described with respect to the data presented to the screenshot 800 of FIG. 8. Examples of this functionality are described with respect to the publishing proxy 112 of FIG. 1. Some embodiments additionally derive a second machine learning model that is an older version of the first machine learning model. Examples of this are described with respect to the model derivation component 116 of FIG. 1 and the "model snapshot" attribute of FIG. 7.

Figure 10:
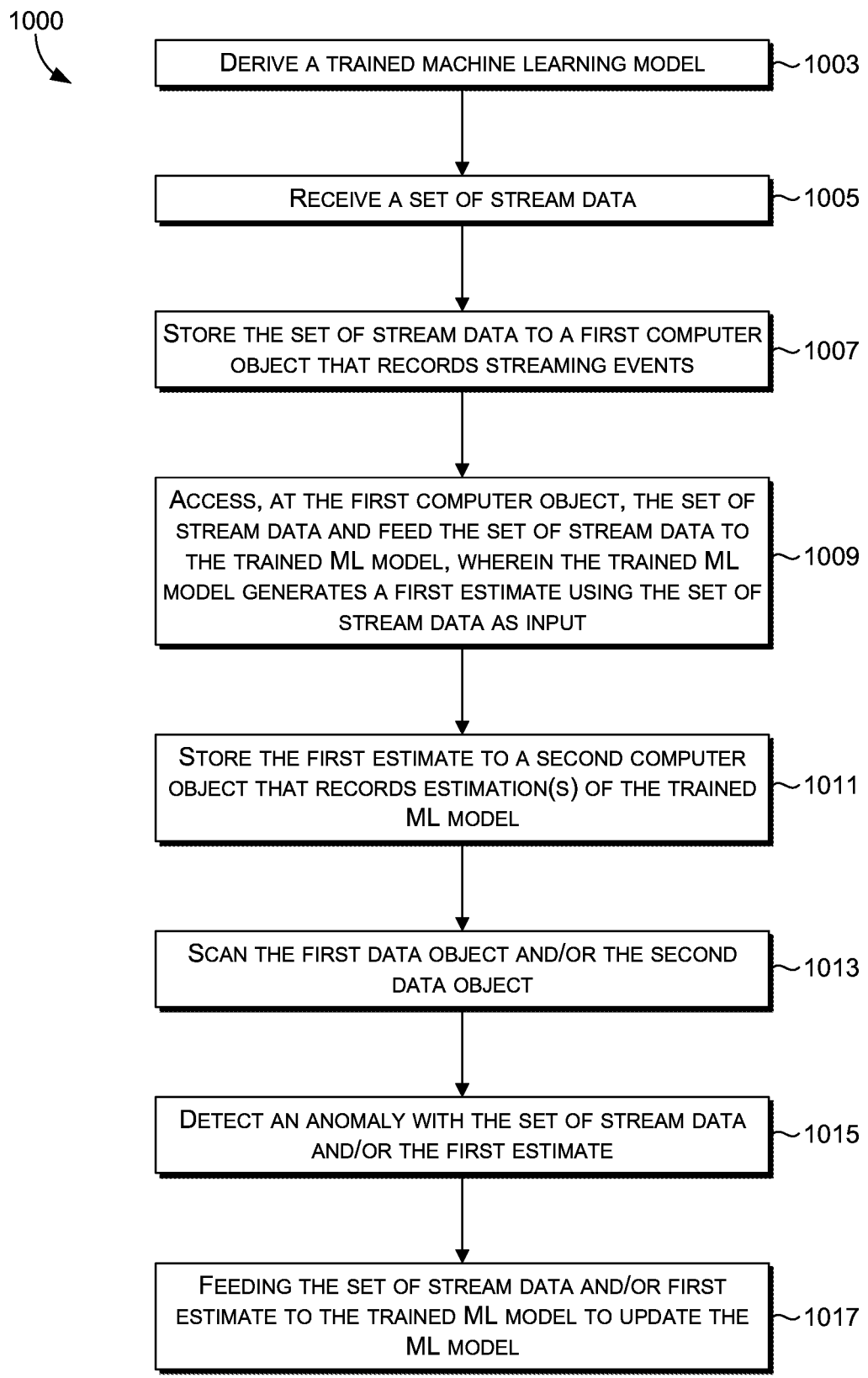
FIG. 10 is a flow diagram of an example process of updating a trained machine learning model, according to some embodiments.

FIG. 10 is a flow diagram of an example process 1000 of updating a trained machine learning model, according to some embodiments. In some embodiments, the process 1000 occurs in response or subsequent to the process 900 of FIG. 9. Per block 1003, a trained machine learning model is derived (e.g., received or generated). For example, the deployed model 224 or the trained model 210 can be derived. Per block 1005, a set of stream data is received (e.g., the first subset of stream data at block 904). Per block 1007, some embodiments store the set of stream data to a first computer object that records streaming events. For example, the first computer object ca be a journal data structure (e.g., 600 of FIG. 6) that includes a plurality of timestamped streaming events. In some embodiments, the derived machine learning model is a containerized model that creates uniformity of interface for model management, which also helps various embodiments scale models better. A "containerized" model is a model that has been built in a container. Containers are software instances that enable virtualization at the operating system level. That is, with containerization, the kernel of an operating system that manages a host computer is configured to provide multiple isolated use space instances. These instances, referred, to as containers, appear as unique servers from the standpoint of an end user that communicates with the containers. However, from the standpoint, of the operating system that manages the host computer on which the containers execute, the containers are user processes that are scheduled and dispatched by the operating system. Examples of a container daemon include the open-source Docker platform made available by Docker, Inc. and Linux Containers (LXC).

Per block 1009 some embodiments access, at the first computer object, the set of stream data and feed the first set of stream data to the trained machine learning model, wherein the trained machine learning model generates a first estimate using the set of stream data as input. In some embodiments, block 1009 occurs at least partially in response to detecting a triggering event (e.g., as detected by the triggering event detector 304). Examples of this are described with respect to FIG. 7, where the payload input data entries of the journal data structure 600 are accessed in order to make a prediction associated with the entry ID 1 of the journal data structure 700 of FIG. 7.

Per block 1011, some embodiments store the first estimate to a second computer object that records one or more estimates of the trained machine learning model. Examples of this are described with respect to the journaling components 108, 208, and 308. In some embodiments, the second computer object represents the journal data structure 700 of FIG. 7.

Per block 1013, some embodiments scan the first computer object and/or the second computer object. For example, referring back to FIG. 1, the model and dataset monitoring component 114 can scan both of the journal data structures 600 and 700 of FIG. 6 and FIG. 7 to detect an anomaly. Per block 1015, some embodiments detect (e.g., in response to the scanning) an anomaly within the set of stream data and/or the first estimate. Examples of this are described with respect to the model and dataset monitoring component 114 of FIG. 1. Per block 1017, particular embodiments feed (e.g., based at least in part on the detecting of the anomaly) the set of stream data and/or the first estimate to the trained machine learning model to update the machine learning model. Examples of this are described with respect to the model updating component 117 of FIG. 1, the model updating component 217 of FIG. 2, the adding the journal data to the training data inputs 515 of FIG. 5, and the like.

In some embodiments, block 1017 includes retraining the trained machine learning model based at least in part on the detecting of the anomaly, as described, for example, with respect to FIG. 5. Some embodiments generate a second estimate via a second machine learning model based at least in part on the feeding and the retraining of the trained machine learning model. Examples of this are described with respect to the model updating component 117 of FIG. 1. Some embodiments also generate a second machine learning model based on using stream data as input (e.g., and not including trained machine learning model inputs) if, for example, there is too much data/model drift with the trained machine learning model. For example, all of the payload input data within the journal data structure 600 can be used as input to train and generate a machine learning model. Some embodiments also cause one or more notifications to be provided to a consuming device as described, for example, with respect to the publishing proxy 112 of FIG. 1, and block 910 of FIG. 9. In some embodiments, the set of stream data is a subset of stream data from a larger pool of streaming data. For example, the larger pool of streaming data can be the data received from all of the data sources 301, and the subset of data can be the data that only the model 313 needs to make predictions.

Figure 11:
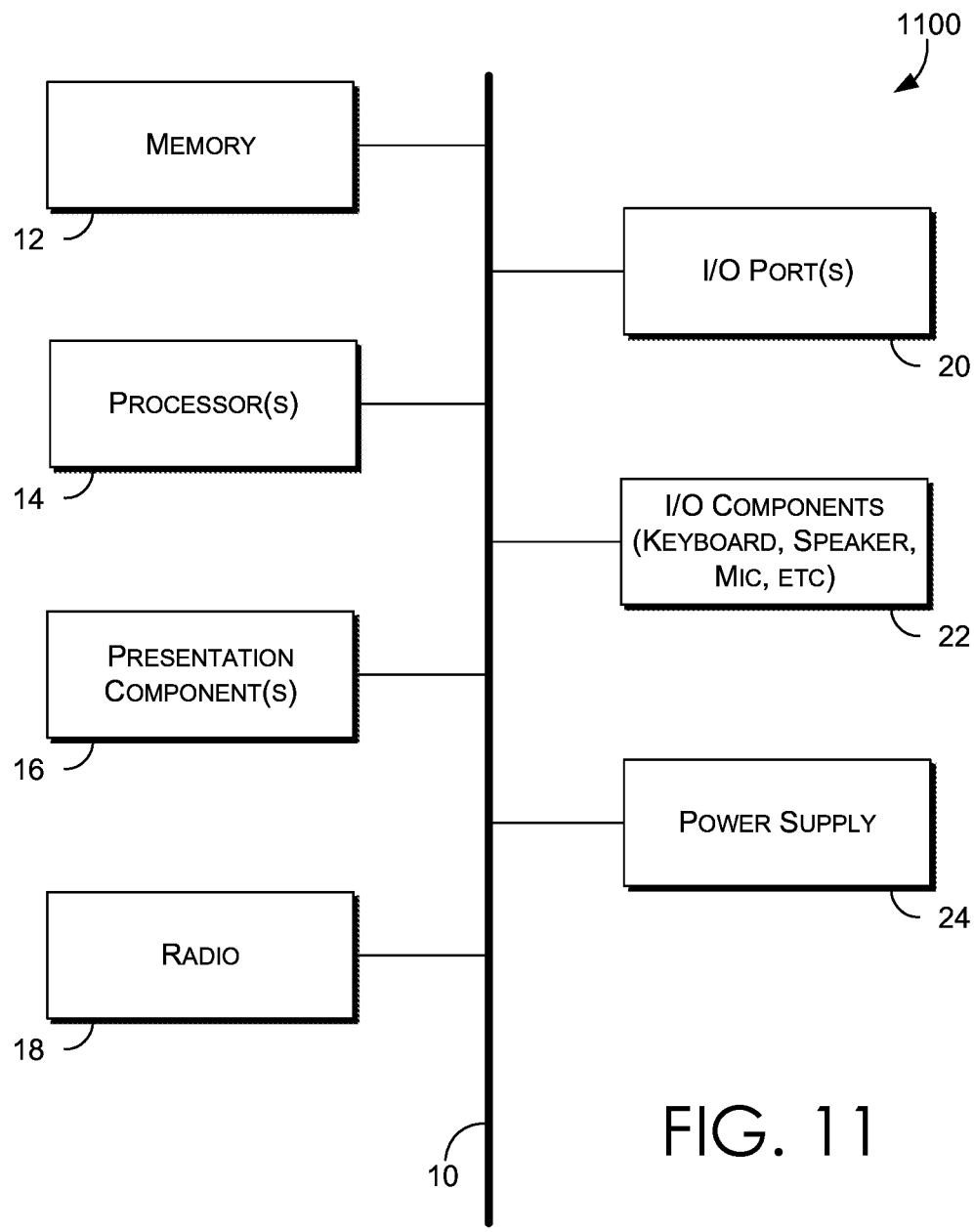
FIG. 11 is a block diagram of a computing device for use in implementing particular embodiments of the present disclosure.

Having described embodiments of the present invention, an exemplary operating environment in which embodiments of the present invention may be implemented is described below in order to provide a general context for various aspects of the present invention. Referring initially to FIG. 11 in particular, an exemplary operating environment for implementing embodiments of the present invention is shown and designated generally as computing device 1100. Computing device 1100 is but one example of a suitable computing environment and is not intended to suggest any limitation as to the scope of use or functionality of the invention. Neither should the computing device 1100 be interpreted as having any dependency or requirement relating to any one or combination of components illustrated.

Looking now to FIG. 11, computing device 1100 includes a bus 10 that directly or indirectly couples the following devices: memory 12, one or more processors 14, one or more presentation components 16, input/output (I/O) ports 18, input/output components 20, and an illustrative power supply 22. Bus 10 represents what may be one or more busses (such as an address bus, data bus, or combination thereof). Although the various blocks of FIG. 11 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 11 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 11 and reference to "computing device."

Computing device 1100 typically includes a variety of computer-readable media. Computer-readable media can be any available media that can be accessed by computing device 1100 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 12 includes computer-storage media in the form of volatile and/or nonvolatile memory. The memory may be removable, non-removable, or a combination thereof. Exemplary hardware devices include solid-state memory, hard drives, optical-disc drives, etc. Computing device 1100 includes one or more processors that read data from various entities such as memory 12 or I/O components 20. Presentation component(s) 16 present data indications to a user or other device. Exemplary presentation components include a display device, speaker, printing component, vibrating component, etc. In some embodiments, the memory includes program instructions that, when executed by one or more processors, cause the one or more processors to perform any functionality described herein, such as the processes 900, 1000, and/or any of the functionality described with respect to the system 100 of FIG. 1.

I/O ports 18 allow computing device 1100 to be logically coupled to other devices including I/O components 20, some of which may be built in. Illustrative components include a microphone, joystick, game pad, satellite dish, scanner, printer, wireless device, etc. The I/O components 20 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1100. The computing device 1100 may be equipped with depth cameras, such as stereoscopic camera systems, infrared camera systems, RGB camera systems, touchscreen technology, and combinations of these, for gesture detection and recognition. Additionally, the computing device 1100 may be equipped with accelerometers or gyroscopes that enable detection of motion. The output of the accelerometers or gyroscopes may be provided to the display of the computing device 1100 to render immersive augmented reality or virtual reality.

Figure 12:
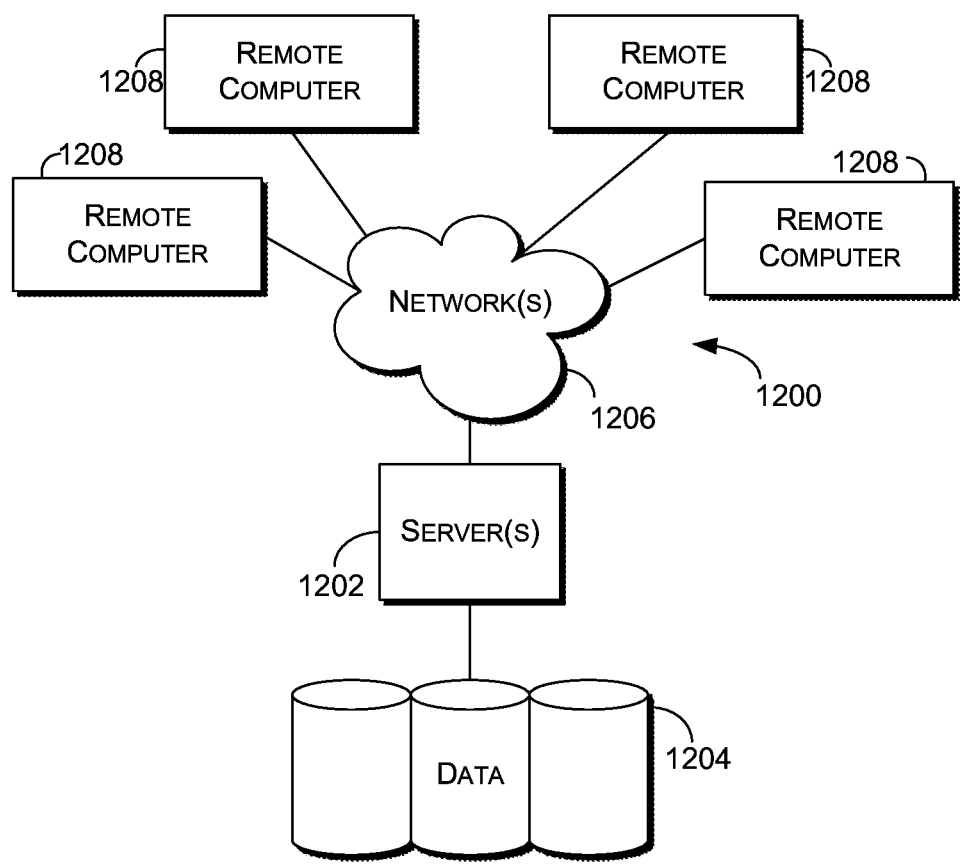
FIG. 12 is a block diagram of an example computing environment with which embodiments of the present disclosure may be implemented.

An exemplary computing environment 1200 suitable for use in implementing embodiments of the present invention is described below. FIG. 12 is an exemplary computing environment (e.g., medical-information computing-system environment) with which embodiments of the present invention may be implemented. The computing environment 1200 is illustrated and designated generally as reference numeral 1200. In some embodiments, the computing environment includes the system 100 of FIG. 1. The computing environment 1200 is merely an example of one suitable computing environment and is not intended to suggest any limitation as to the scope of use or functionality of the invention. Neither should the computing environment 1200 be interpreted as having any dependency or requirement relating to any single component or combination of components illustrated therein.

The present invention might be operational with numerous other computing system environments or configurations. Examples of well-known computing systems, environments, and/or configurations that might be suitable for use with the present invention include personal computers, server computers, hand-held or laptop devices, wearable devices, multiprocessor systems, microprocessor-based systems, set top boxes, programmable consuming device electronics, network PCs, minicomputers, mainframe computers, distributed computing environments that include any of the above-mentioned systems or devices, and the like.

The present invention might be described in the general context of computer-executable instructions, such as program modules, being executed by a computer. Exemplary program modules comprise routines, programs, objects, components, and data structures that perform particular tasks or implement particular abstract data types. The present invention might be practiced in distributed computing environments where tasks are performed by remote processing devices that are linked through a communications network. In a distributed computing environment, program modules might be located in association with local and/or remote computer storage media (e.g., memory storage devices).

With continued reference to FIG. 12, the computing environment 1200 comprises one or more computing devices in the form of server(s) 1202. Exemplary components of the server(s) 1202 comprise a processing unit, internal system memory, and a suitable system bus for coupling various system components, including data store 1204, with the server(s) 102. The system bus might be any of several types of bus structures, including a memory bus or memory controller, a peripheral bus, and a local bus, using any of a variety of bus architectures. Exemplary architectures comprise Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

The server(s) 1202 typically includes therein, or has access to, a variety of computer-readable media. Computer-readable media can be any available media that might be accessed by server(s) 1202, and includes volatile and nonvolatile media, as well as, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by control server 1202. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media. In some embodiments, the server(s) 1202 include some or each of the components 100 of FIG. 1.

The server(s) 1202 might operate in one or more computer networks 1206 using logical connections to one or more remote computers 1208 (e.g., consuming devices). Remote computers 1208 might be located at a variety of locations in a medical or research environment, including clinical laboratories (e.g., molecular diagnostic laboratories), hospitals and other inpatient settings, ambulatory settings, medical billing and financial offices, hospital administration settings, home healthcare environments, clinicians' offices, Center for Disease Control, Centers for Medicare & Medicaid Services, World Health Organization, any governing body either foreign or domestic, Health Information Exchange, and any healthcare/government regulatory bodies not otherwise mentioned. Clinicians may comprise a treating physician or physicians; specialists such as intensivists, surgeons, radiologists, cardiologists, and oncologists; emergency medical technicians; physicians' assistants; nurse practitioners; nurses; nurses' aides; pharmacists; dieticians; microbiologists; laboratory experts; laboratory technologists; genetic counselors; researchers; students; and the like. The remote computers 1208 might also be physically located in nontraditional medical care environments so that the entire healthcare community might be capable of integration on the network. The remote computers 1208 might be personal computers, servers, routers, network PCs, peer devices, other common network nodes, or the like and might comprise some or all of the elements described above in relation to the control server 102. The devices can be personal digital assistants or other like devices.

Computer network(s) 1206 comprise a local area network (LANs) and/or a wide area network (WAN). Such networking environments are commonplace in offices, enterprise-wide computer networks, intranets, and the Internet. When utilized in a WAN networking environment, the server(s) 1202 might comprise a modem or other means for establishing communications over the WAN, such as the Internet. In a networking environment, program modules or portions thereof might be stored in association with the server(s) 1202, the data store 1204, or any of the remote computers 1208. For example, various application programs may reside on the memory associated with any one or more of the remote computers 1208. It will be appreciated by those of ordinary skill in the art that the network connections shown are exemplary and other means of establishing a communications link between the computers (e.g., server(s) 1202 and remote computers 1208) might be utilized.

In operation, an organization might enter commands and information into the server(s) 1202 or convey the commands and information to the server(s) 1202 via one or more of the remote computers 1208 through input devices, such as a keyboard, a pointing device (commonly referred to as a mouse), a trackball, or a touch pad. Other input devices comprise microphones, satellite dishes, scanners, or the like. Commands and information might also be sent directly from a remote healthcare device to the server(s) 1202. In addition to a monitor, the server(s) 102 and/or remote computers 108 might comprise other peripheral output devices, such as speakers and a printer.

Although many other internal components of the server(s) 1202 and the remote computers 1208 are not shown, such components and their interconnection are well known. Accordingly, additional details concerning the internal construction of the control server 1202 and the remote computers 1208 are not further disclosed herein, such as with respect to the computing device 1100 of FIG. 11. In some embodiments, the server(s) 1202 represent a stand-alone computer or computing system, such as a mainframe, blade server, and the like. Alternatively, in some embodiments, the server(s) 1202 represent a set of distributed computers, such as multiple cloud computing nodes where data is provisioned or exchanged between the cloud computing nodes.

As can be understood, embodiments of the present invention provide for, among other things, generating proof and attestation service notifications corresponding to a determined veracity of a claim. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub combinations are of utility and may be employed without reference to other features and sub combinations. This is contemplated by and is within the scope of the claims.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A computer-implemented method comprising:
   deriving a trained machine learning model using a set of training data;
   deploying a first copy of the trained machine learning model to a first production environment;
   subsequent to the deploying the first copy of the trained machine learning model:
   based on a first mapping between (a) the first copy of the trained machine learning model and (b) a plurality of data source entities, maintaining a first computer object storing a first set of stream data corresponding to the first copy of the trained machine learning model;
   at least partially in response to detecting a first triggering event corresponding to the first copy of the trained machine learning model:
   accessing, at the first computer object, the first set of stream data; and
   feeding the first set of stream data to the first copy of the trained machine learning model; and
   generating a first estimate by the first copy of the trained machine learning model using the first set of stream data as input;
   storing the first estimate to a second computer object storing a first plurality of estimates generated by the first copy of the trained machine learning model;

scanning at least one of: the first computer object or the second computer object;

in response to the scanning, detecting an anomaly with at least one of: the first set of stream data or the first estimate; and based at least in part on the detecting of the anomaly and the first mapping, updating the first copy of the trained machine learning model for first production environment by feeding at least a second set of stream data, associated with the plurality of data sources, to the first copy of the trained machine learning model.

2. The method of claim 1, wherein:

the first computer object is a first journal data structure;

the second computer object is a second journal data structure;

the first journal data structure includes a plurality of timestamped streaming events; and the second journal data structure includes a plurality of timestamped estimates generated by the trained machine learning model.

3. The method of claim 1, wherein the first triggering event is at least one triggering event of a group of triggering events consisting of: a synchronous request for the first estimate, a time-based event, a data condition, and an entity change event.

4. The method of claim 1, wherein the anomaly includes at least one of: data drift of the set of stream data, model drift of the trained machine learning model, bias of the trained machine learning model, model performance of the trained machine learning model, and latency of data flow for the set of stream data.

5. The method of claim 1, wherein updating the first copy of the trained machine learning model comprises:

retraining the first copy of the trained machine learning model based at least in part on the detecting of the anomaly.

6. The method of claim 5, further comprising, based at least in part on the feeding and the retraining of the first copy of the trained machine learning model, generating a second estimate via the first copy of the trained machine learning model.

7. The method of claim 1, further comprising causing one or more notifications to be provided to a consuming device, wherein the one or more notifications include at least one notification of a group of notifications consisting of: the detected anomaly, the first estimate, the set of stream data, an indication of latency associated with the first estimate, data in the first computer object, and data in the second computer object.

8. The method of claim 1, wherein:

the set of stream data is a first subset of stream data from a pool of streaming data;

the pool of streaming data comprises a plurality of stream data respectively received from a plurality of different data sources, and the method further comprises:

based a first mapping between (a) the first copy of the machine learning model and (b) the first subset of stream data from the pool of streaming data, sending the first subset of stream data to the first copy of the trained machine learning model, wherein the generating of the first estimate is based at least in part on the first mapping; and based a second mapping between (a) a second machine learning model and (b) a second subset of stream data from the pool of streaming data, sending a second set of stream data of the pool of streaming data to the second machine learning model, wherein:

the second set of stream data is different than the first set of stream data;

the second machine learning model is a second copy of the trained machine learning model, and a second estimate of the second machine learning model is based at least in part on the mapping of the second subset of stream data.

9. The method of claim 1, wherein the updating of the first copy of the trained machine learning model causes a generation of a second machine learning model, the method further comprising:

subsequent to the updating of the first copy of the trained machine learning model, reading at least one of: the first computer object and the second computer object to derive the first copy of the trained machine learning model before the first copy of the trained machine learning model was updated;

in response to the reading, evaluating the second machine learning model against the first copy of the trained machine learning model; and based on the evaluating, causing the second machine learning model to be deployed or causing a notification to be rendered.

10. The method of claim 1, further comprising:

deploying a second copy of the trained machine learning model to a second production environment;

subsequent to the deploying the second copy of the trained machine learning model:

based on a second mapping between (a) the second copy of the machine learning model and (b) a second plurality of data source entities, maintaining a third computer object storing a second set of stream data corresponding to the second copy of the trained machine learning model, wherein the second set of stream data is different than the first set of stream data;

at least partially in response to detecting a second triggering event corresponding to the second copy of the trained machine learning model:

accessing, at the third computer object, the second set of stream data;

feeding the second set of stream data to the second copy of the machine learning model; and generating a second estimate by the second copy of the trained machine learning model using the second set of stream data as input;

storing the second estimate to a fourth computer object that records estimates generated by the second copy of the trained machine learning model;

scanning at least one of: the third computer object or the fourth computer object;

in response to the scanning, detecting an anomaly with at least one of: the set of stream data or the second estimate; and based at least in part on the detecting of the anomaly, updating the second copy of the machine learning model for the second production environment by feeding at least one of the set of stream data or the second estimate to the second copy of the trained machine learning model.

11. Method of claim 10, wherein the first set of stream data and the second set of stream data are subsets of stream data from a pool of streaming data associated with a plurality of production environments.

12. A system comprising:
one or more processors; and
one or more computer storage media storing computer-useable instructions that, when used by the one or more processors, cause the one or more processors to perform-operations comprising:
   deriving a trained machine learning model using a set of training data;
   deploying a first copy of the trained machine learning model to a first production environment;
   subsequent to the deploying the first copy of the trained machine learning model:
      based on a first mapping between (a) the first copy of the machine learning model and (b) a plurality of data source entities, maintaining a first computer object storing a first set of stream data corresponding to the first copy of the machine learning model;
      at least partially in response to detecting of a first triggering event corresponding to the first copy of the machine learning model and based at least in part on the mapping:
         accessing, at the first computer object, the first set of stream data;
         feeding the first set of stream data as input to the first copy of the trained machine learning model; and
         generating a first estimate by the first copy of the trained machine learning model using the first set of stream data;
      storing the first estimate to a second computer object storing a first plurality of estimates generated by the first copy of the trained machine learning model;
      scanning at least one of: the first computer object or the second computer object;
      in response to the scanning, detecting an anomaly with at least one of: the first set of stream data or the first estimate; and
      based at least in part on the detecting of the anomaly and the first mapping, updating the first copy of the machine learning model for first production environment by feeding at least a second set of stream data, associated with the plurality of data sources, to the first copy of the trained machine learning model.

13. The system of claim 12, wherein:
the first computer object is a first journal data structure;
the second computer object is a second journal data structure;
the first journal data structure includes a plurality of timestamped streaming events;
the first journal data structure includes a plurality of timestamped streaming events; and
the second journal data structure includes a plurality of timestamped estimates generated by the first copy of the trained machine learning model.

14. The system of claim 12, wherein the first triggering event is at least one triggering event of a group of triggering events consisting of: a synchronous request for the first estimate, a time-based event, a data condition, and an entity change event.

15. The system of claim 12, wherein updating the first copy of the machine learning model comprises retraining the first copy of the machine learning model based at least in part on the detecting an anomaly.

16. The system of claim 12, the operations further comprise:
causing one or more notifications to be provided to a consuming device, wherein the one or more notifications include at least one notification of a group of notifications consisting of: a detected anomaly, the first estimate, the first set of stream data, an indication of latency associated with the first estimate, and data in the first computer object.

17. The system of claim 12, the operations further comprise:
mapping a second set of stream data of the set of stream data to a second machine learning model, wherein a second estimate of the second machine learning model is made based at least in part on the mapping of the second set of stream data.

18. The system of claim 12, wherein the operations further comprise:
deriving a second machine learning model that is an older version of the first copy of the trained machine learning model.

19. The system of claim 12, wherein the operations further comprise:
deploying a second copy of the trained machine learning model to a second production environment;
subsequent to the deploying the second copy of the trained machine learning model:
   based on a second mapping between (a) the second copy of the trained machine learning model and (b) a second plurality of data source entities, maintaining a third computer object storing a second set of stream data corresponding to the second copy of the trained machine learning model, wherein the second set of stream data is different than the first set of stream data;
   at least partially in response to detecting a second triggering event corresponding to the second copy of the trained machine learning model:
      accessing, at the third computer object, the second set of stream data;
      feeding the second set of stream data to the second copy of the trained machine learning model; and
      generating a second estimate by the second copy of the trained machine learning model using the second set of stream data as input;
   storing the second estimate to a fourth computer object that records estimates generated by the second copy of the machine learning model;
   scanning at least one of: the third computer object or the fourth computer object;
   in response to the scanning, detecting an anomaly with at least one of: the set of stream data or the second estimate; and
   based at least in part on the detecting of the anomaly, updating the second copy of the machine learning model for the second production environment by feeding at least one of the set of stream data or the second estimate to the second copy of the trained machine learning model.

20. The system of claim 19, wherein the first set of stream data and the second set of stream data are subsets of stream data from a pool of streaming data associated with a plurality of production environments.

21. One or more computer storage media having computer-executable instructions embodied thereon that, when executed, by one or more processors, cause the one or more processors to perform operations comprising:
deriving a trained machine learning model using a set of training data;
deploying a first copy of the trained machine learning model to a first production environment;

subsequent to the deploying the first copy of the trained machine learning model:
  based on a first mapping between (a) the first copy of the machine learning model and (b) a plurality of data source entities, maintaining a first computer object storing a first set of stream data corresponding to the first copy of the machine learning model;
  at least partially in response to detecting of a first triggering event corresponding to the first copy of the machine learning model and based at least in part on the mapping:
    accessing, at the first computer object, the first set of stream data;
    feeding the first set of stream data as input to the first copy of the machine learning model; and
    generating a first estimate by the first machine learning model using the first set of stream data;
  storing the first estimate to a second computer object storing a first plurality of estimates generated by the first copy of the trained machine learning model;
  scanning at least one of: the first computer object or the second computer object;
  in response to the scanning, detecting an anomaly with at least one of: the first set of stream data or the first estimate; and
  based at least in part on the detecting of the anomaly and the first mapping, updating the first copy of the machine learning model for first production environment by feeding at least a second set of stream data, associated with the plurality of data sources, to the first copy of the trained machine learning model.

22. The one or more computer storage media of claim 21, wherein the operations further comprise:
  deploying a second copy of the trained machine learning model to a second production environment;
  subsequent to the deploying the second copy of the trained machine learning model:
    based on a second mapping between (a) the second copy of the trained machine learning model and (b) a second plurality of data source entities, maintaining a third computer object storing a second set of stream data corresponding to the second copy of the trained machine learning model, wherein the second set of stream data is different than the first set of stream data;
    at least partially in response to detecting a second triggering event corresponding to the second copy of the trained machine learning model:
      accessing, at the third computer object, the second set of stream data;
      feeding the second set of stream data to the second copy of the trained machine learning model; and
      generating a second estimate by the second copy of the trained machine learning model using the second set of stream data as input;
    storing the second estimate to a fourth computer object that records estimates generated by the second copy of the trained machine learning model;
    scanning at least one of: the third computer object or the fourth computer object;
    in response to the scanning, detecting an anomaly with at least one of: the set of stream data or the second estimate; and
    based at least in part on the detecting of the anomaly, updating the second copy of the machine learning model for the second production environment by feeding at least one of the set of stream data or the second estimate to the second copy of the trained machine learning model.

23. The one or more computer storage media of claim 22, wherein the first set of stream data and the second set of stream data are subsets of stream data from a pool of streaming data associated with a plurality of production environments.

* * * * *